US010954684B2

United States Patent
Rüdlinger

(10) Patent No.: US 10,954,684 B2
(45) Date of Patent: Mar. 23, 2021

(54) ASSEMBLY SYSTEM FOR MODULAR INDUSTRIAL PLANTS

(71) Applicant: RV Lizenz AG, Cham (CH)

(72) Inventor: Mikael Rüdlinger, Zurich (CH)

(73) Assignee: RV Lizenz AG, Cham (CH)

( * ) Notice: Subject to any disclaimer, the term of this patent is extended or adjusted under 35 U.S.C. 154(b) by 0 days.

(21) Appl. No.: 15/538,318

(22) PCT Filed: Dec. 23, 2015

(86) PCT No.: PCT/EP2015/081223
§ 371 (c)(1),
(2) Date: Jun. 21, 2017

(87) PCT Pub. No.: WO2016/102703
PCT Pub. Date: Jun. 30, 2016

(65) Prior Publication Data
US 2017/0350150 A1    Dec. 7, 2017

(30) Foreign Application Priority Data

Dec. 24, 2014    (EP) ..................................... 14200301

(51) Int. Cl.
*E04H 5/02* (2006.01)
*E04H 9/02* (2006.01)
(Continued)

(52) U.S. Cl.
CPC .............. *E04H 5/02* (2013.01); *E04B 1/3483* (2013.01); *E04B 1/34352* (2013.01); *E04B 1/98* (2013.01);
(Continued)

(58) Field of Classification Search
CPC ....... E04H 5/02; E04H 9/021; E04B 1/34352; E04B 1/3483; E04B 1/98; E04B 1/4157;
(Continued)

(56) References Cited

U.S. PATENT DOCUMENTS 3,500,595 A * 3/1970 Bennett ................. E04B 1/3483
52/79.13
3,999,355 A * 12/1976 Stucky ................ E04B 1/34823
52/745.03
(Continued)

FOREIGN PATENT DOCUMENTS

FR    2653812 A1    5/1991
GB    1244356 A     9/1971
(Continued)

OTHER PUBLICATIONS

International Preliminary Report on Patentability, dated Jul. 6, 2017.

*Primary Examiner* — Theodore V Adamos
(74) *Attorney, Agent, or Firm* — Wuersch & Gering LLP

(57) ABSTRACT

The invention relates to a modular plant (1), in particular a modular industrial plant, comprising a plurality of cuboid-shaped plant modules (20, 40, 40a, 40c), which are arranged in two or more layers stacked one above the other. The modules have a support structure having fastening points (24, 24', 44, 44'), wherein the fastening points are provided for connecting a module to corresponding fastening points of the adjacent modules of a layer located above and/or below thereof. In the horizontal plane, the modules of a layer are connected to the adjacent modules of the layer located above and/or below thereof in a form-fit manner by means of a connection element (64) having the shape of a double cone or of a double conical frustum. At least one traction device (62, 70, 80) having a tension member (62) is provided, by way of which traction device a bottom layer of modules (40a) or a foundation block (6) can be impinged upon with a tensile force along the vertical, with respect to a top layer of modules (40c) such that along the vertical, the modules between said bottom layer (12) and said top layer (11) and the adjacent modules of the layer located above (Continued)

and/or below thereof are positively pressed together at the fastening points and are thus fixed in place.

23 Claims, 16 Drawing Sheets

(51) Int. Cl.
  *E04B 1/348* (2006.01)
  *E04B 1/343* (2006.01)
  *E04B 1/98* (2006.01)
  *F16F 15/04* (2006.01)
  *E04B 1/41* (2006.01)
  *E04B 1/35* (2006.01)
  *E04C 3/34* (2006.01)

(52) U.S. Cl.
  CPC ............ *E04H 9/021* (2013.01); *F16F 15/04* (2013.01); *E04B 1/34321* (2013.01); *E04B 1/4157* (2013.01); *E04B 2001/3583* (2013.01); *E04C 3/34* (2013.01)

(58) Field of Classification Search
  CPC ......... E04B 1/34321; E04B 2001/3583; E04B 1/343; E04B 1/348; E04B 2001/1996; F16F 15/04; E04C 3/34
  See application file for complete search history.

(56) References Cited

U.S. PATENT DOCUMENTS

| | | | |
|---|---|---|---|
| 4,294,185 A * | 10/1981 | Nordstrom | B63B 25/004 114/75 |
| 4,694,621 A * | 9/1987 | Locke | E04B 1/3483 52/79.13 |
| 4,766,708 A | 8/1988 | Sing | |
| 5,474,411 A | 12/1995 | Schoenfeld et al. | |
| 6,026,618 A * | 2/2000 | Locke | B28D 1/041 403/147 |
| 6,151,844 A | 11/2000 | Kovachevich | |
| 6,257,427 B1 | 7/2001 | Schneid | |
| 6,871,453 B2 | 3/2005 | Locke | |
| 8,297,002 B2 * | 10/2012 | Fernandez Fernandez | B66C 1/666 52/79.1 |
| 8,621,788 B2 * | 1/2014 | Tedesco | E04B 1/2403 403/230 |
| 9,366,020 B2 | 6/2016 | Farnsworth | |
| 10,337,185 B2 * | 7/2019 | Espinosa | E02D 35/00 |
| 2004/0182016 A1 * | 9/2004 | Locke | E04B 1/22 52/79.13 |
| 2006/0156657 A1 * | 7/2006 | Commins | E04B 1/2604 52/223.13 |
| 2006/0196132 A1 * | 9/2006 | Ruano | E04B 1/34823 52/236.3 |
| 2008/0060296 A1 * | 3/2008 | Espinosa | E02D 27/34 52/293.3 |
| 2009/0077904 A1 * | 3/2009 | Ziegler | E04B 1/3483 52/79.1 |
| 2011/0173907 A1 * | 7/2011 | Katsalidis | E04B 1/3483 52/236.3 |
| 2012/0238645 A1 | 9/2012 | Rüdlinger | |
| 2016/0017595 A1 * | 1/2016 | Lee | E04B 1/3483 52/653.2 |

FOREIGN PATENT DOCUMENTS

| | | |
|---|---|---|
| JP | 2000192554 A | 7/2000 |
| WO | 1995030814 A1 | 11/1995 |
| WO | 2004051017 A1 | 6/2004 |
| WO | 2004/094752 A1 | 11/2004 |
| WO | 2005121464 A1 | 12/2005 |
| WO | 2008/027234 A2 | 3/2008 |
| WO | 2010/031129 A1 | 3/2010 |
| WO | 2012070281 A1 | 5/2012 |
| WO | 2014/074508 A1 | 5/2014 |
| WO | WO-2015186029 A2 * | 12/2015 ............ E04B 1/2403 |

* cited by examiner (a)

(b)

(a)

(b)

ASSEMBLY SYSTEM FOR MODULAR INDUSTRIAL PLANTS

FIELD OF TECHNOLOGY

The invention relates to modular facilities, in particular modular industrial facilities, supply facilities, production facilities etc. The invention further relates to modules for such facilities, and assembly sets for constructing modular facilities, according to the preambles of the independent claims.

TECHNOLOGICAL BACKGROUND

For certain facilities, in particular industrial facilities, supply facilities, production facilities, etc., it may be desirable to construct them in a modular manner, for example to allow rapid and efficient adaptation to new requirements. This may be the case for chemical production facilities, for example, when a change in the product to be produced makes it necessary to adapt or exchange the individual components. Such large chemical facilities frequently require the arrangement of a fairly large number of facility modules in multiple assembly levels situated one above the other. For this purpose, several types of open framework structures and also enclosed buildings are known in the prior art.

In industrial facilities, facility elements are often used which create vibration, for example motors, turbines, etc. Industrial facilities must therefore preferably be constructed so that such vibrations are not able to propagate in the overall structure, or-allowed to build up.

Large industrial facilities, in particular chemical manufacturing facilities or oil refineries, are particularly vulnerable to natural disasters such as earthquakes or storms. In regions having an increased risk for such catastrophes, or in particularly endangered areas, for example densely populated areas, such facilities must be constructed in such a way that they are able to withstand extreme external influences. The spatial dimensions as well as the modular construction of such facilities, which is often present, make it very difficult to meet this requirement. In addition, the number, types, sizes, and weights of the individual facility modules (components) usually vary greatly from facility to facility. Furthermore, the characteristics of a facility may change considerably over its lifetime, for example because the capacity utilization of the facility fluctuates, or because the facility is rebuilt and facility modules are replaced, removed, or added. Having to adapt the support structure of such a facility to new circumstances often requires expensive modifications to its usually complicated architecture, based on complex, costly dynamic structural-mechanical analyses.

A modular construction is likewise advantageous for industrial facilities that must be efficiently dismantled and made transportable, for example to be transported to a remote location and reconstructed. Examples of possible applications here are power plants, processing facilities, control facilities, etc., that are required in mining, but which may have to be updated after a few years.

EP 0572814 A1 discloses a chemical facility having a multi-story structural unit having various building segments with superposed rooms. The facility components together with the associated connections are accommodated in these rooms on mobile stands. The facility components may be quickly removed from the rooms and exchanged on the stands from the sides. In contrast, the basic structure is fixed, and cannot be easily modified or exchanged.

Modular systems should advantageously be made up of relatively small-volume individual parts so that they may be efficiently transported. The assembly and disassembly, in turn, should be possible without major construction effort.

It is known to assemble individual modules the size of standard cargo containers, for example to erect a temporary building for large construction sites. Such modular systems are easy to transport due to the standard sizes of the modules, and may be stacked next to and on top of one another, the same as normal cargo containers. However, such structures have only limited stability, and in particular are not protected from high mechanical stresses such as those occurring during earthquakes, for example.

Further systems are known from the prior art for constructing buildings that are protected in particular from natural disasters such as earthquakes and storms.

U.S. Pat. No. 6,151,844 describes structures for creating one- or multi-story buildings, having wall elements that are pretensioned in the vertical direction via tension rods. Due to the pretensioning of the wall elements, they are stabilized against external wind effects and earthquakes.

WO 2005/121464 A1 describes frame structures for earthquake-resistant modular buildings, in which the beams are brought together to form connecting nodes, so that forces from the beams are concentrically transmitted to these nodes.

WO 95/30814 A1 describes vibration-damped and earthquake-resistant buildings, made up of a deformable vertical core building and an outer structure surrounding same, which are connected by means of energy-absorbing damping elements. The outer structure comprises a lower portion that is supported against the subsurface, with vibration damping, and an upper portion supported thereon.

U.S. Pat. No. 4,766,708 describes a modular system for vibration-damped building structures. The system has a frame structure with essentially rectangular receiving areas into which modular units may be inserted. The receiving areas each have vibration-insulating elements.

WO 2014/074508 A1 describes a system for connecting modular units, in which in each case eight stacked cuboid-shaped modules that meet at the corners are joined by means of a plate. The connecting plate is screwed to the roof beams of four modules of a lower layer that abut at the corners. Four modules of an upper layer are placed with their base beams on the connecting plate, a correct orientation of the modules being ensured with annular pins. In each case two superposed connecting elements are braced together by tension rods within support columns at the vertical edges of the modules. This results in a form-fit and force-fit connection of all eight mutually abutting modules at their corners. These individual connecting points are mechanically insulated from one another, in the sense that they are only indirectly connected to one another via the modules.

GB 1244356 discloses another system for the modular construction of buildings made up of a plurality of cuboid-shaped modules. The modules comprise four vertical support columns, in the form of a hollow profile, which at two oppositely situated side faces are connected at the edges to cross braces, and at the other two oppositely situated side faces are connected via side walls in the form of corrugated panels. At the top, the module is closed off by a ceiling panel, and at the bottom, by a floor panel. In each case the support columns of the eight mutually abutting modules are connected to one another in the horizontal in a form-fit manner at the corners by a connecting element. Tension rods, via which the aligned support columns of all superposed modules are braced against one another, are situated in the support columns. This results in a form-fit and force-fit connection of the mutually abutting modules at their corners. Here as well, the connecting points are mechanically insulated from one another.

WO 2010/031129 A1 discloses another system for the modular construction of buildings made up of a plurality of modules. In each case two vertical support columns are situated on the outer surface at the cuboid-shaped modules on two opposite side walls in the longitudinal direction. The support columns are slightly offset, so that the support columns of two laterally adjacent modules are in flush alignment with one another in the longitudinal direction. The corresponding two modules are fixed to one another by screwing these support columns together. Adjacent modules are connected in the longitudinal direction in an analogous manner. The support columns of superposed modules are situated in alignment, with centering elements ensuring a correct orientation. The aligned support columns are likewise screwed together in pairs. This results in connecting points, at which in each case four modules that adjoin one another at the edges are connected in a form-fit manner. One or two such connecting points are provided at each edge. These individual connecting points are mechanically insulated from one another.

WO 2004/094752 A1 discloses yet another system for the modular construction of buildings. Situated between superposed support columns of modules are connecting elements, having an outer flange and an upper and a lower truncated cone having various pitch angles. A through hole is situated in alignment with the truncated cones and the flange. In the installed state, the flange of one connecting module rests on the support column of the module therebelow, and the support column of the module thereabove rests on the flange of the connecting element. The truncated cones of the connecting element are situated in corresponding cone-shaped recesses in the support columns. A continuous tension rod is situated vertically through all superposed support columns and connecting elements, the modules being braced against one another in the vertical direction via the tension rod. When the modules are moved laterally, it is provided that after a certain displacement distance the inclined cone wall of the connecting element rests on the inclined cone wall of the receiving opening in the support column, so that a further lateral displacement also results in a displacement in the vertical, opposite the spring force of the tension rod, which thus acts as a shock absorber. Further connecting elements having two adjacent truncated cone elements are provided, via which two laterally adjacent modules may be connected to one another at the corners. Here as well, the individual connecting points of the modules of the overall structure are mechanically insulated from one another.

None of these systems allow the implementation of modular industrial facilities that can be flexibly designed, efficiently assembled and disassembled, whose modules may be easily transported, and which at the same time are secure from extreme mechanical stresses such as earthquakes or storms.

Therefore, there is a general need for progress in this area.

Object of the Invention

The object of the invention is to provide modular facilities of the type stated at the outset, which do not have the above-mentioned and other disadvantages.

A modular facility according to the invention should advantageously allow planning and design of the facility. It should be possible to efficiently assemble and disassemble the mentioned modular facilities. At the same time, the modular facility should be secure against extreme mechanical stresses such as earthquakes or storms, as well as general weather effects.

The individual modules of the facility are advantageously easy to transport. The basic structure of the individual facility modules is intended to be cost-effective to manufacture.

A further object of the invention is to provide assembly sets for the construction of modular facilities, which allow the construction of such facilities from individual modules.

These and other objects are achieved by a modular facility according to the invention, modules according to the invention for modular facilities, and assembly sets according to the invention for constructing modular facilities, according to the independent claims.

Further preferred embodiments are set forth in the dependent claims.

DESCRIPTION OF THE INVENTION

Within the scope of the present disclosure, the term "modular facility" refers, among other things, to industrial facilities made up of individual modules, for example chemical production facilities in which various components (for example, reactors, tanks, filters, pumps, heat exchangers, etc.) are typically in operative connection with one another, for example via lines, etc.

Such industrial facilities may also include other processing facilities, for example devices for crushing, washing, sorting, or transporting rock, for example in mining. Power plants may also have a modular construction. For example, a facility for utilizing carbon-containing materials and for generating energy is known from WO 2011/01299 A1 by the present applicant. Such a facility may also be implemented as a modular facility.

It is clear to those skilled in the art that the term "modular facility" encompasses essentially all technical or industrial facilities and units that are or may be made up of individual modules, in particular chemical production facilities, power plants, supply facilities, purification facilities, processing facilities, etc., as well as other facilities such as storage systems, parking garages, and modular buildings that may be constructed from individual modules.

In a first aspect of the invention relating to a modular facility according to the invention, in particular a modular industrial facility, with multiple cuboid-shaped facility modules that are arranged in two or more layers stacked one above the other, the modules have a support structure having fastening points, the fastening points being provided for connecting a module to corresponding fastening points of the adjoining modules of a layer situated above and/or below same;

in the horizontal plane, the modules of one layer are connected in a form-fit manner to the adjoining modules of the layer situated above and/or below same;

at least one tension device having a tension element is provided, via which a lowermost layer of modules or a foundation block can be acted on with a tensile force along the vertical, with respect to an uppermost layer of modules, so that along the vertical, the modules between the said lowermost layer and the said top layer together with the adjoining modules of the layer situated above and/or below same are pressed together with a force fit at the fastening points, and are thus fixed in place;

three or more support elements that define a first plane are situated on a top side of the support structure of the modules, and three or more support elements that define a second plane that is parallel to the first plane are situated on a bottom side of the support structure facing away from the top side, the support elements being used as fastening points of the modules;

one support element on the top side and one support element on the bottom side in each case form a pair, and are aligned with one another along a straight line that is parallel to the normal of the planes;

the said support elements have a conical recess; and two mutually facing support elements of two adjoining modules of adjacent layers are connected by a connecting element, the connecting element having the shape of a double cone or a double truncated cone, and in each case one cone or truncated cone of the connecting element being situated in the conical seating of one of the two support elements and resting on same in direct flush alignment.

The conical lateral surfaces of the connecting elements and the conical lateral surfaces of the seatings of the support elements are shaped in such a way that a cone or truncated cone of a connecting element is able to rest in flush alignment in the conical seating of a support element without a portion of the associated module resting on a surface of the connecting element that is not part of the lateral surface of the said cone or truncated cone, in particular not on a surface of the connecting element that is perpendicular to the longitudinal axis of the double cone or double truncated cone.

A support column may be situated in each case between two paired support elements of a module. The support column absorbs the static forces along the vertical.

The tension device advantageously includes an anchor for the tension element in a module of the lowermost layer, and a tensioning device via which the tension element may be tensioned and/or the tensile stress may be maintained. The tension element may be designed, for example, as a single tension rod or multiple parallel tension rods, or as a single tension cable or multiple parallel tension cables. The tension device particularly advantageously has a spring element that is able to compensate to a certain degree for changes in length of the tension element due to external factors, for example changes in temperature.

In one advantageous variant of a facility according to the invention discussed above, layers having a support module and layers having one or more functional modules are arranged one above the other in alternation.

In another advantageous variant of a facility according to the invention discussed above, the modules are arranged in such a way that for at least one layer of modules, the fastening points of two or more modules of the said layer are connected to fastening points of a common module of a layer situated above and/or below same. As a result, adjacent modules of a layer are mechanically connected via the jointly connected module of another layer, resulting in reinforcement for the overall facility.

In another advantageous variant of a facility according to the invention discussed above, the modules are interlocked and stacked in such a way that at least a portion of the modules form a three-dimensional lattice. This feature also results in mechanical reinforcement of the overall facility.

The modular facility which is mechanically stabilized overall in this way, due to its great rigidity, is able to vibrate only to a very limited extent, so that vibrations caused by Individual facility parts, such as rotating machines or other sources of vibrations, or external mechanical influences, for example wind effects or earthquakes, are not able to build up, and the natural frequencies of the structure are as high as possible.

In yet another advantageous variant of a facility according to the invention discussed above, the support elements of the modules have a central opening, so that a tension element is or may be led through the openings along the straight line that is defined by two paired support elements in each case.

In yet another advantageous variant of a facility according to the invention discussed above, the connecting element has a through hole through which a tension element is or may be led.

In such a facility according to the invention discussed above, the modules are advantageously arranged in such a way that the support elements of all modules are in alignment along a plurality of straight lines that are parallel to the vertical, and a tension element may be led through, or a tension element is situated, along each of these straight lines.

One particularly advantageous variant of a facility according to the invention discussed above has at least one tensioning device for maintaining the tensile stress on a tension element during changes in temperature, having a basic structure that is fastened to or supported on a module of the uppermost layer or of the lowermost layer of the facility, a support that is movable with respect to the basic structure along the longitudinal axis of the tension element, and a spring element that is situated between the basic structure and the movable support, wherein a first end of the tension element rests on the movable support of the tensioning device or is connected thereto, a second end of the tension element rests on an opposite side of the facility on a counterbearing or is connected thereto, and the ratio D1/D2 of a first spring constant D1 of the tension element to a second spring constant D2 of the spring element is at least 4/1, preferably at least 6/1, and particularly preferably at least 9/1.

An assembly set according to the invention for constructing a modular facility according to the first aspect of the invention comprises multiple modules having a support structure, wherein three or more support elements that define a first plane are situated on a top side of the support structure; three or more support elements that define a second plane that is parallel to the first plane are situated on a bottom side of the support structure facing away from the top side; a support element on the top side and a support element on the bottom side in each case form a pair and are aligned with one another along a straight line that is parallel to the normal of the planes; and the said support elements have a conical recess;

multiple connecting elements that have the shape of a double cone or a double truncated cone; and one or more tension elements;

wherein the conical lateral surfaces of the connecting elements and the conical lateral surfaces of the seatings of the support elements are shaped in such a way that a cone or truncated cone of a connecting element is able to rest in flush alignment in the conical seating of a support element without a portion of the associated module resting on a surface of the connecting element that is not part of the lateral surface of the said cone or truncated cone, in particular not on a surface of the connecting element that is perpendicular to the longitudinal axis of the double cone or double truncated cone.

The support elements of the modules advantageously have a central opening, so that a tension element may be led through the openings along the straight line that is defined by two paired support elements in each case.

In one advantageous embodiment of such an assembly set according to the invention, the connecting elements have a through hole through which a tension element may be led.

Another advantageous embodiment of such an assembly set according to the invention includes at least one tensioning device for maintaining the tensile stress on a tension element during changes in temperature, having a basic structure that may be fastened to or supported on a module, a support that is movable with respect to the basic structure, and a spring element that is situated between the basic structure and the movable support, wherein a first end of a tension element is supportable on the movable support of the tensioning device or is connectable thereto, and the ratio D1/D2 of a first spring constant D1 of the tension element to a second spring constant D2 of the spring element is at least 4/1, preferably at least 8/1, and particularly preferably at least 9/1.

In a second aspect of the invention, a modular facility according to the invention has multiple cuboid-shaped facility modules that are arranged in two or more layers stacked one above the other. The modules have a support structure having fastening points, the fastening points being provided for connecting a module to corresponding fastening points of the adjoining modules of a layer situated above and/or below same. In the horizontal plane (in the horizontal), the modules of one layer are connected in a form-fit manner to the adjoining modules of the layer situated above and/or below same. In addition, at least one tension device having a tension element is provided, via which a lowermost layer of modules or a foundation block can be acted on with a tensile force along the vertical, with respect to an uppermost layer of modules, so that along the vertical (vertical axis), the modules between the said lowermost layer and the said top layer together with the adjoining modules of the layer situated above and/or below same along the vertical are pressed together with a force fit at the fastening points, and are thus fixed in place.

The tension device advantageously includes an anchor for the tension element in a module of the lowermost layer, and a tensioning device with which the tension element may be tensioned and/or the tensile stress may be maintained. The tension element may be designed, for example, as a single tension rod or multiple parallel tension rods, or as a single tension cable or multiple parallel tension cables. The tension device particularly advantageously has a spring element that is able to compensate to a certain degree for changes in length of the tension element due to external factors, for example changes in temperature.

In such a modular facility, layers having a support module and layers having one or more functional modules are advantageously arranged one above the other in alternation.

In another advantageous embodiment variant of such a modular facility, the modules are arranged in such a way that for at least one layer of modules, the fastening points of two or more modules of the said layer are connected to fastening points of a common module of a layer situated above and/or below same. As a result, adjacent modules of one layer are mechanically connected via the jointly connected module of another layer, resulting in reinforcement for the overall facility.

It is likewise advantageous when, in a modular facility according to the invention, the modules are interlocked and stacked in such a way that at least a portion of the modules form a three-dimensional lattice. This feature also results in mechanical reinforcement of the overall facility.

The modular facility which is mechanically stabilized overall in this way, due to its great rigidity, is able to vibrate only to a very limited extent, so that vibrations caused by individual facility parts, such as rotating machines or other sources of vibrations, or external mechanical influences, for example wind effects or earthquakes, are not able to build up, and the natural frequencies of the structure are as high as possible Alternatively or additionally, in such a modular facility according to the invention, three or more support elements that define a first plane are situated on a top side of the support structure of the modules, and three or more support elements that define a second plane that is parallel to the first plane are situated on a bottom side of the support structure facing away from the top side. One support element on the top side and one support element on the bottom side in each case form a pair, and are aligned with one another along a straight line that is parallel to the normal of the planes. The support elements are used as fastening points of the modules.

In such an embodiment of a facility according to the invention, the support elements of the modules particularly advantageously have a conical recess, Additionally or alternatively, the support elements of the modules have a central opening, so that a tension element is or may be led through the openings along the straight line that is defined by two paired support elements in each case.

A support column may be situated in each case between two paired support elements of a module. The support column absorbs the static forces along the vertical.

In one advantageous variant, two mutually facing support elements of two adjoining modules of adjacent layers are connected by a connecting element. The support elements of the modules particularly advantageously have a conical recess, and the connecting element has the shape of a double cone or a double truncated cone, and in each case a cone or truncated cone of the connecting element is situated in flush alignment in the conical seating of one of the two support elements. The connecting element advantageously has a through hole through which a tension element is or may be led.

In a modular facility according to the invention, the modules are particularly advantageously arranged in such a way that the support elements of all modules are in alignment along a plurality of straight lines that are parallel to the vertical. A tension element may be led through, or a tension element is situated, along each of these straight lines.

A module according to the invention for a modular facility has a support structure, wherein three or more support elements that define a first plane are situated on a top side of the support structure, and three or more support elements that define a second plane that is parallel to the first plane are situated on a bottom side of the support structure facing away from the top side. One support element on the top side and one support element on the bottom side in each case form a pair, and are aligned with one another along a straight line that is parallel to the normal of the planes.

The support elements of such a module according to the invention advantageously have a conical recess. Alternatively or additionally, the support elements have a central opening, so that a tension element may be led through the openings along the straight line that is defined by two paired support elements in each case.

In another advantageous variant, a support column is situated in each case between two paired support elements.

An outer shell may be mounted on the support structure of such a module. In one advantageous variant, the outer shell is designed as a standard cargo container (ISO container).

An assembly set according to the invention for constructing a modular facility according to the invention comprises multiple modules according to the invention and one or more tension elements. Such an assembly set particularly advantageously has a plurality of connecting elements to which the fastening points of the modules may be connected.

In a third aspect of the invention, a modular facility according to the invention, in particular a modular industrial facility, comprises multiple cuboid-shaped functional modules that are arranged in two or more layers stacked one above the other, and multiple connecting modules. A connecting module is situated between the oppositely situated side faces of two directly adjacent functional modules, and is connected in a force-fit and/or form-fit manner to the support structure of the particular functional modules at the corresponding side faces of these functional modules, in each case at three or more connecting points situated in a plane.

Two or more connecting modules of a group of connecting modules that are situated in a common plane (x-y), (y-z), or (x-z) are advantageously designed as a common connecting module.

It is likewise advantageous when at least one pair of functional modules is connected by more than one connecting module at their side faces.

BRIEF DESCRIPTION OF THE DRAWINGS

Reference is made below to the drawings for better understanding of the present invention. The drawings merely show exemplary embodiments of the subject matter of the invention, and are not appropriate for limiting the invention to the features disclosed herein.

Identical or functionally equivalent parts are provided with the same reference numerals in the following figures and the associated description. Modules are merely illustrated schematically as cubes or as rounded cubes.

DISCUSSION OF THE INVENTION

Figure 1:
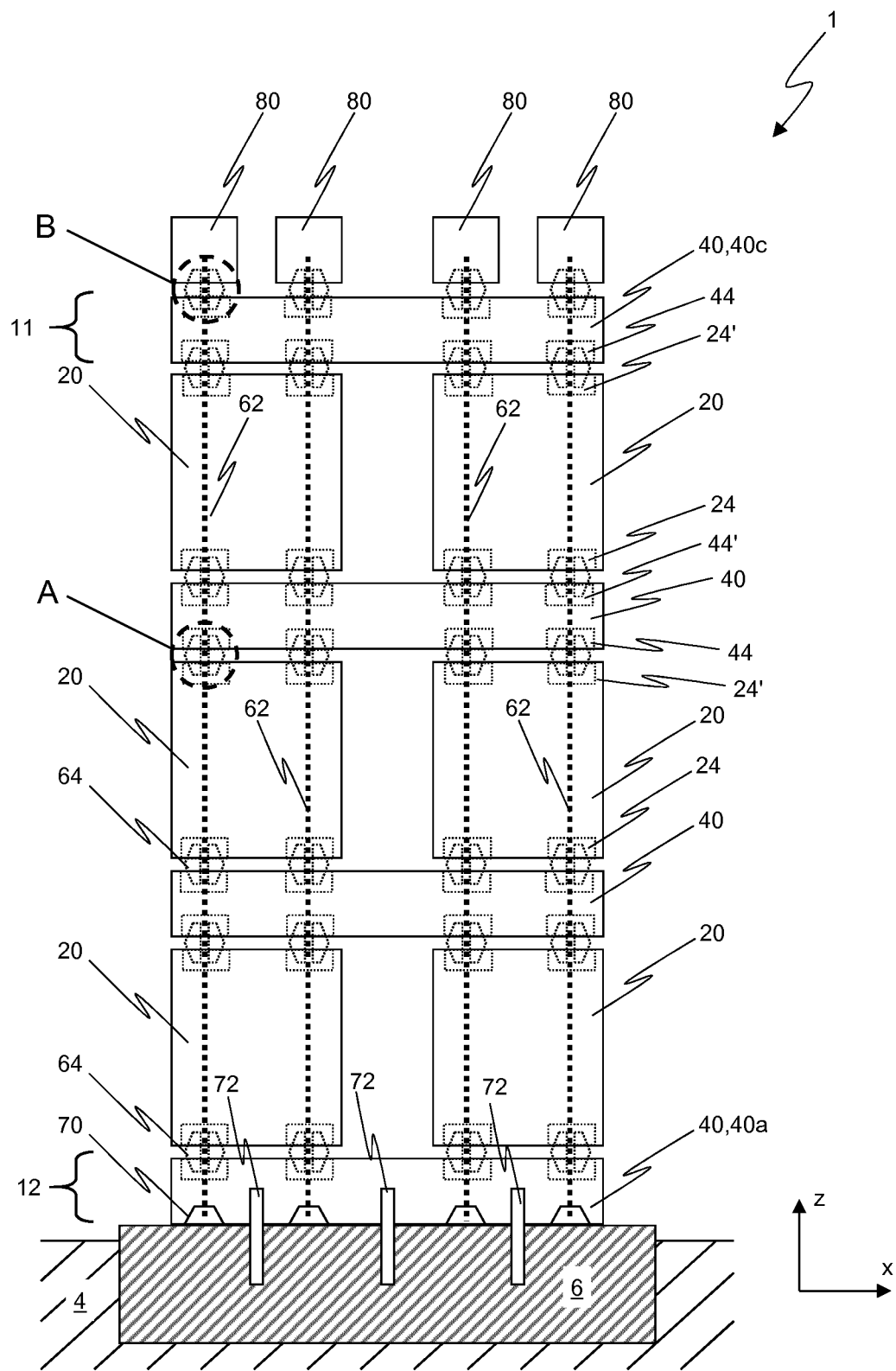
FIG. 1 schematically shows one possible embodiment of a modular facility according to the invention, (a) in a front view, (b) in a side view from the left, and (c) in a top view.
Figure 1:
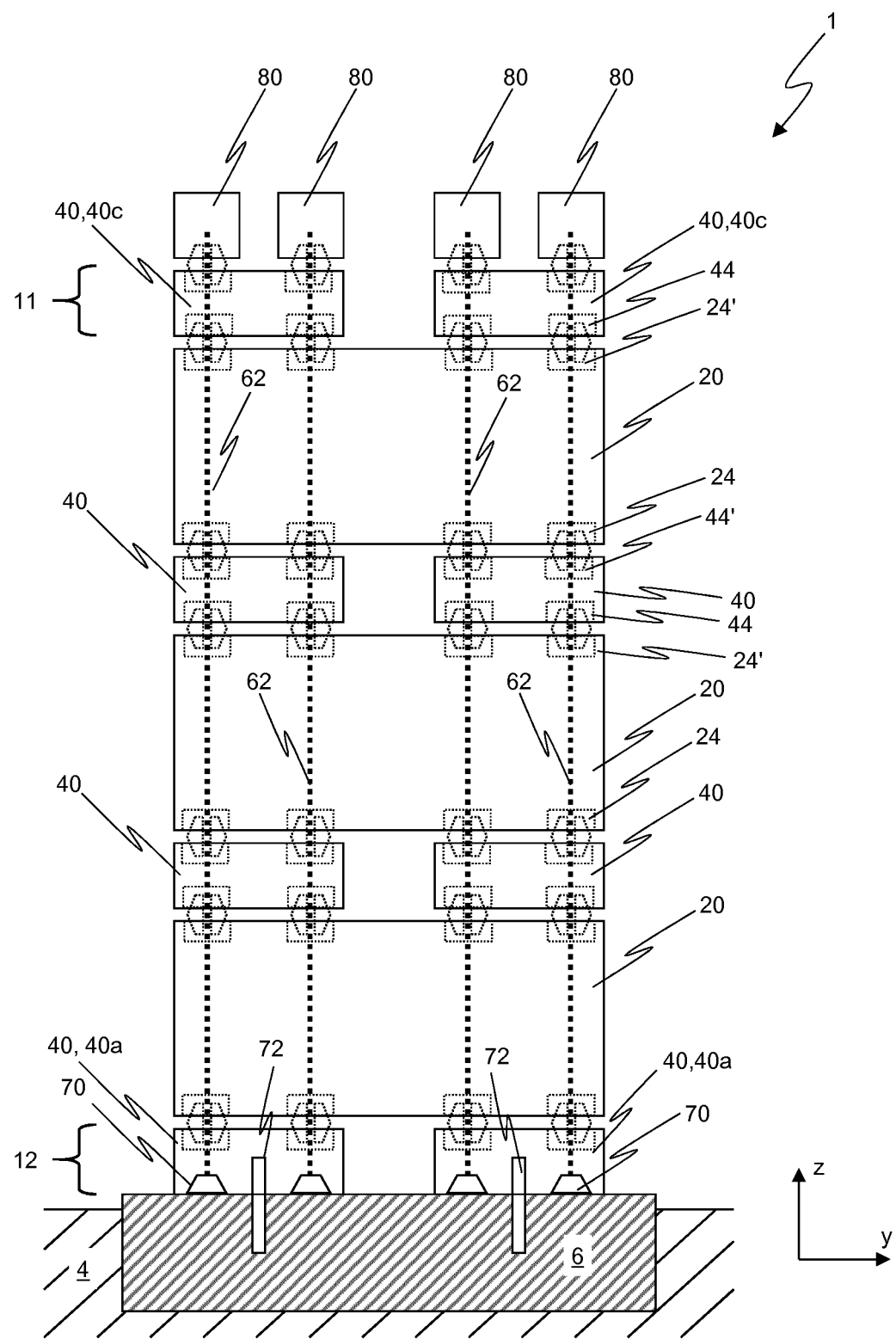
Figure 1:
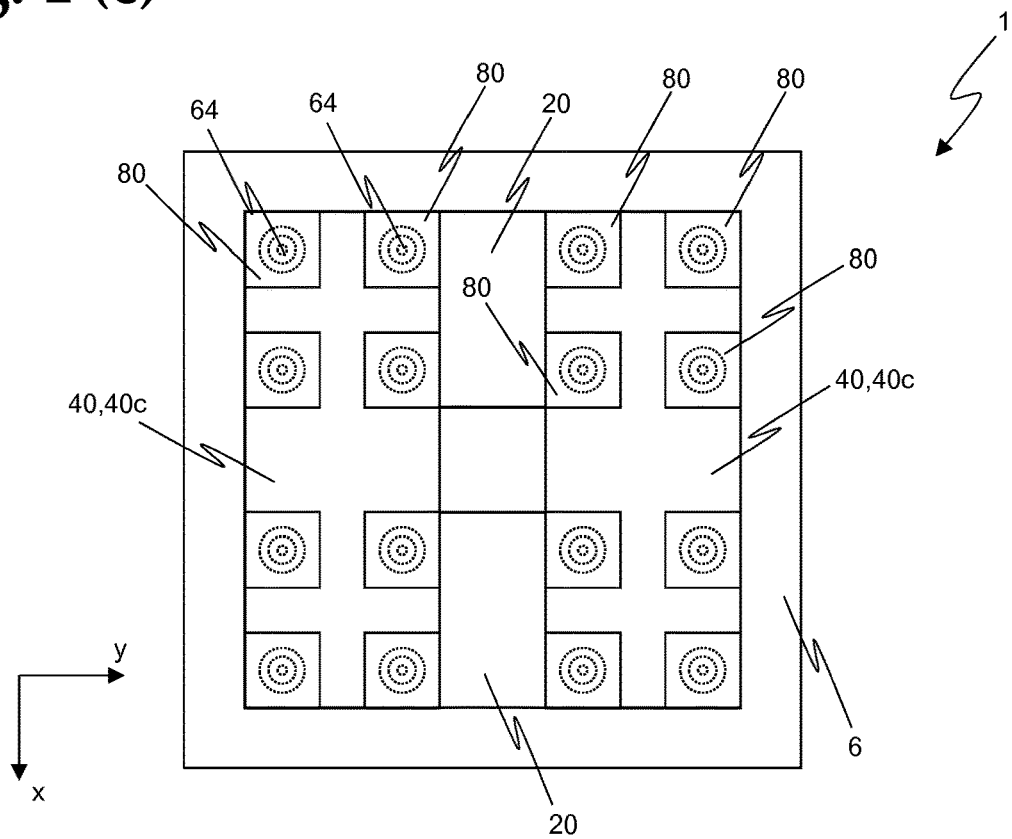
Figure 2:
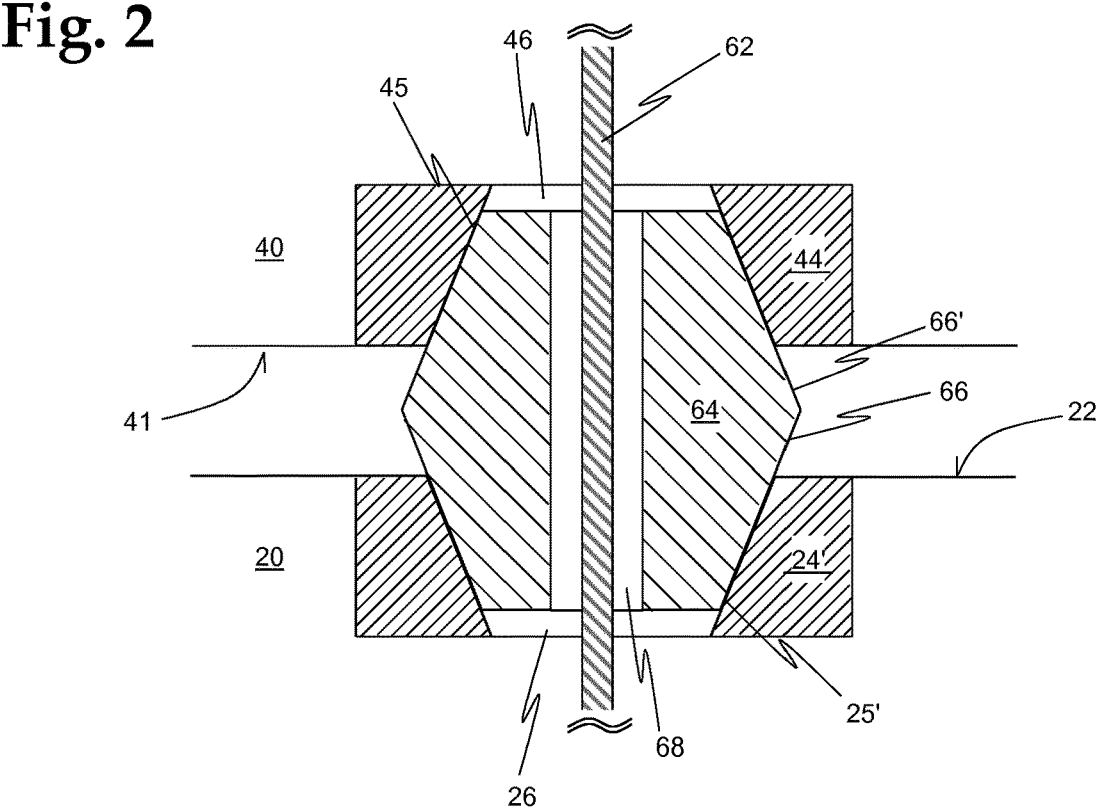
FIG. 2 schematically shows a cross section of the point of connection between two modules (detail A in the modular facility according to the invention from FIG. 1).
Figure 3:
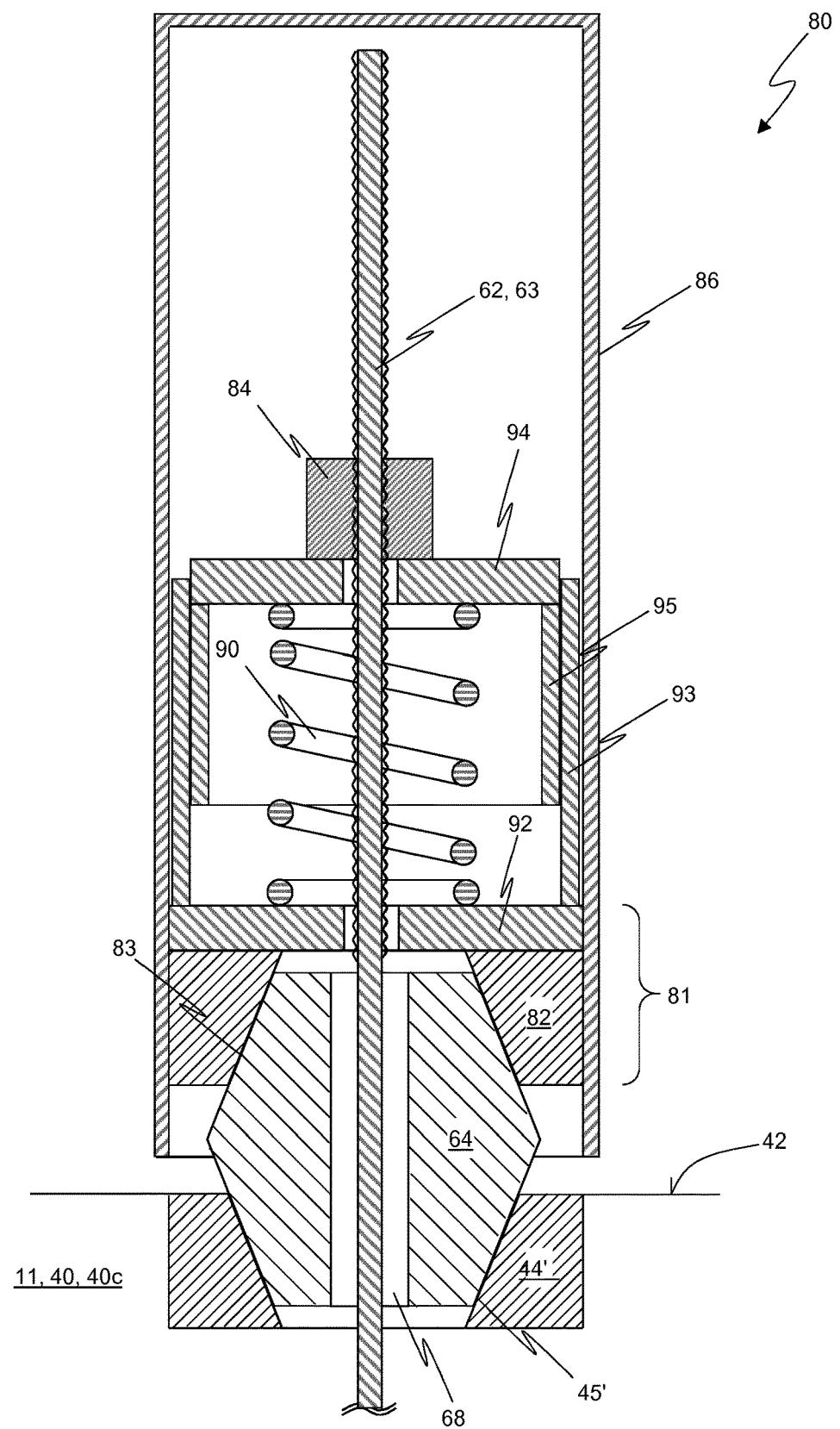
FIG. 3 schematically shows a cross section of the point of connection between a module of the uppermost layer and a tensioning device (detail B in the modular facility according to the invention from FIG. 1).

One possible exemplary embodiment of a modular facility 1 according to the invention is schematically illustrated in FIG. 1. The various points of connection are schematically shown in FIGS. 2 and 3. The modular facility 1 is made up of six functional modules 20 and eight intermediate modules 40, which are stacked in an interlocking manner on a common foundation base 6. The functional modules 20 and intermediate modules 40, which are only schematically shown in the figures, have the outer shape of a cube, and are made up of a support structure and the facility elements that are present in the individual modules. The design of the modules is discussed in greater detail below. For explaining the functional principle of the modular facility according to the invention, it is sufficient to regard the modules as rigid, tension- and pressure-resistant torsionally stable cuboid.

The interlocked stacking of the modules has the effect that forces acting on individual modules, for example due to wind, earthquakes, or mechanical vibrations from machines and devices running in the facility, are not able to directly propagate through the facility structure, and instead are deflected in different directions of the structure. This results in reinforcement of the overall structure, accompanied by an increase in the natural oscillation frequencies.

The modules 20, 40 have eight support elements 24, 24', 44, 44' each on the top side and the bottom side, in which connecting elements 64 (only schematically indicated in FIG. 1) are situated, which center the modules with respect to one another and fix them in place in a form-fit manner in the horizontal plane. Due to their arrangement, connecting elements situated one above the other are in flush alignment along the vertical (vertical axis). In the vertical direction, tension elements 62 which brace the modules against one another in the vertical direction extend through all modules 20, 40 and connecting elements 64.

In the example shown, the connecting elements 64 have the shape of a mirror-symmetrical double truncated cone having two conical lateral surfaces 66, 66' and a through hole 68 for leading through the tension element 62, which in the exemplary embodiment shown is implemented as a tension rod.

Other shapes would also be possible, for example truncated pyramids. However, the double conical shape has the advantage that the connecting element is automatically centered in the likewise conical support element. In addition, upon final tensioning of the tension elements, the conical connecting elements are pressed into the likewise conical layer seatings in such a way that significant mechanical stability results from this measure alone. This correspondingly requires that, as in the example shown, the connecting elements and the support elements are adapted to one another in such a way that only the conical lateral surface of the cone of the connecting element and the conically concave lateral surface of the seating of the support element rest against one another. In addition, for the conical shape shown it is not important which side of the double truncated cone is on the bottom and which is on top, or which angular position is provided, which simplifies the Installation. The connecting elements are advantageously made of forged steel.

The tension elements 62 extend vertically, between tension rod anchors 70 in the lowermost layer of intermediate modules 40, 40a, through all modules 20, 40 and connecting elements 64, to tensioning devices 80 above the uppermost layer modules 40, 40c. The tension elements, as in the example shown, may be designed as tension rods, in particular one-piece tension rods, or as tension rods made up of two or more parts. Such tension rods may be made of steel, for example, or other suitable materials such as carbon fibers. In addition, tension cables may be used instead of tension rods, although tension cables provide no added value due to the static application, and tension rods are advantageous on account of the simpler manufacture and installation. It is likewise possible to use multiple tension rods or wire cables, guided in parallel, as the tension element.

The functional modules 20 and the intermediate modules 40 on the bottom side 21, 41 have support elements 24, 44 with conical lateral surfaces 25, 25, 45, 45', and central openings 26, 46 in which the connecting elements 64 are situated. Identical support elements 24', 44' are situated on the top side 22, 42. These support elements are advantageously made of a suitable metallic material, and are stably connected to the support structure (not illustrated) of the module 20.

The connection between two modules 20, 40 is shown in FIG. 2 (detail A in FIG. 1). The connecting element 64 is situated in a support element 24' on the top side 22 of a functional module 20, and with the lower conical lateral surface 66 rests on the conical lateral surface 25' of the support element 24'. On the bottom side 41 of the intermediate module 40 situated thereabove, a support element 44 rests with the conical lateral surface 45 on the upper conical lateral surface 66' of the connecting element 64. The tension rod 62 extends from the anchoring device, through the central opening 26 in the support element 24, through the through hole 68, and through the central opening 46 in the support element 44, toward the tensioning device at the upper end of the facility.

The intermediate modules 40, 40a of the lowermost layer rest directly or indirectly on a concrete foundation 6, and are fastened in the foundation base 6 in a form-fit manner with suitable foundation anchors 72. During assembly of the modules 40, 40a of the lowermost layer, it may be necessary to use spacer elements to ensure a permanent correct horizontal orientation of the modules on the foundation base. Tension rod anchors 70 (only schematically indicated in FIG. 1), to which the tension rods 62 are fastened, are situated in the modules of the lowermost layer. This may be a nut, for example, that is screwed onto a terminal external thread of the tension rod. However, those skilled in the art are also familiar with various other options for reversibly anchoring a tension rod in a structure.

As an alternative to anchoring the tension rods in the modules of the lowermost layer and separately anchoring these modules in the foundation, direct anchoring of the tension rods in the foundation block 8 would also be possible. However, this variant requires the mounting of anchoring devices and support elements in the foundation, which similarly must be precisely oriented, and is correspondingly more complicated. In such an embodiment variant, the foundation block 8 in principle may be treated as a lowermost module.

Situated on the top side of the uppermost layer of intermediate modules 40, 40c are tensioning devices 80, which are used to keep the tensile stress of the tension elements within a certain tolerance range over a wide temperature range. This is particularly important due to the fact that the modular facilities according to the invention are exposed to the weather, and may be subjected to correspondingly large temperature fluctuations. For a linear expansion coefficient of steel of approximately $10^{-5}$ K$^{-1}$ at room temperature, if the temperature changes by 50° C., which may occur, for example, in desert regions during the course of the day, for an unstressed steel tension rod having a length of 20 meters this may result in a change in length of 10 mm. Within a small expansion range, a tension rod acts as a very stiff tension spring having an essentially constant spring constant. If a tension rod is directly tensioned, as is customary, so that the resulting tensile force is a linear function of the expansion of the tension rod, such a change in length results in a significant decrease or a significant increase in the tensile stress. In the extreme case, the result is that tensile stress is no longer present at all, or the value is in an excessively high range that may lead to damage to the tension rod. For example, for a tension rod having an original length of 20 m, which is expanded by 20 mm, a decrease in length of −10 mm would result in an approximately 50% higher tensile force, or an increase in length of +10 mm would result in an approximately 50% lower tensile force.

The tensioning device in FIG. 3 solves this problem, in that an additional spring element 90, implemented in the illustrated exemplary embodiment as a precompressed compression coil spring, compensates for a positive or negative change in length of the tension rod 62. In the tensioned state, the force of the compressed compression spring 90 corresponds to the oppositely directed tensile force of the tension rod, which acts as a tension spring. The spring constant D2 of the spring element 90 is selected so that it is significantly less than the spring constant D1 of the tension rod; i.e., the compression spring is softer. When the tension rod contracts or expands due to changes in temperature, the compressed or expanded compression spring then simultaneously compensates for a large part of the effect of the change in length. For spring elements situated in series, this results in a spring constant D for the overall system of $1/D=(1/D1+1/D2)$. If the ratio of the spring constants is D1/D2=9/1, for example, the spring constant of the overall system is now 90% of D2, or 10% of D1. If the tension rod now contracts or expands due to a decrease in temperature, the increase or decrease of the tensile force is only approximately 10% of the value for a system having only a tension rod, without a spring. With a suitable selection of the spring constants, the values of the tensile force thus remain in a comparatively narrow range, even for extreme changes in temperature.

Another advantage of a modular facility according to the invention having such tensioning devices is the behavior during earthquakes. During violent earthquakes it is possible for the entire modular facility to be accelerated upwardly and then dropped downwardly, corresponding to a negative acceleration. For the latter, the acceleration forces do not act over the support structure of the facility, but instead act over the tension rods. Even in such a case, the compression spring compensates for this stress, and ensures that the modules securely hold together, even under negative acceleration.

The shown exemplary embodiment of a tensioning device 80 is placed with a conical support element 82 on a connecting element 64, which in turn rests on a support element 44' of an intermediate module 40, 40c, analogously to the connection between the modules 20, 40 as described above. A first support disk 92, having a central opening and a sleeve 93, on which the compression spring 90 rests, is situated on the support element 82. The compression spring thus rests at one end on a basic structure 81 of the tensioning device 80 that is statically supported on the uppermost layer 11 of the modules. The said support disk 92 is suitably connected to the support element 82, for example by means of screws (not illustrated). A second support disk 94, having a central opening and a sleeve 95, rests on the top side of the compression spring. The sleeves 93, 95 situated one inside the other are used as a guide during expansion/compression of the compression spring. The support disk 94 forms a movable support for the upper end of the tension rod. The tension rod 62 has an external thread at its upper end 63. A nut 84 is screwed onto the external thread, and transmits the tensile force of the tension rod 62 to the second support disk 94 and thus to the compression spring 90. A removable housing 86 protects the tensioning device from weather effects.

The connecting element 64 and the support element 82 could also be designed as one piece instead of as individual elements. Likewise, with suitable dimensioning of the support element 82 with regard to the compression spring 90 that is supported thereon, the support disk 92 may be dispensed with. The spring element of a tensioning device may also be implemented using a tension spring, situated above the tension rod, instead of using a compression spring. It is also possible to use multiple compression springs or stacked disk springs.

Figure 4:
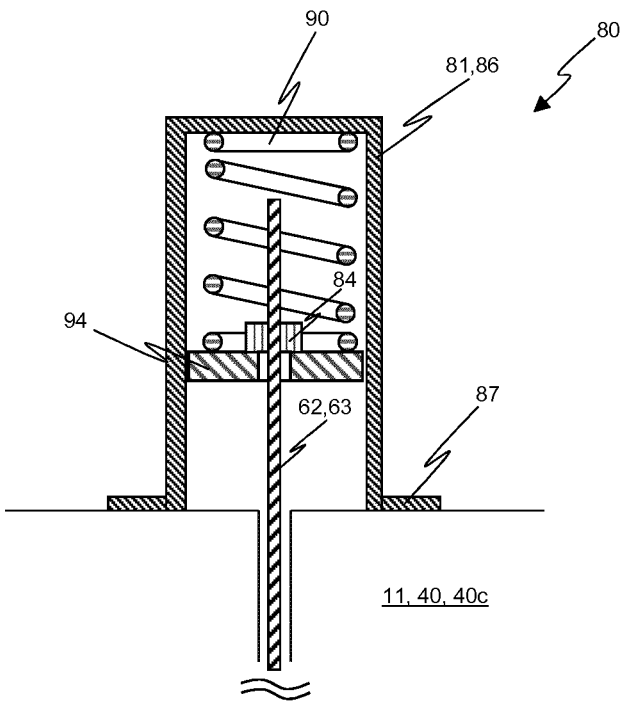
FIG. 4 schematically shows a cross section of one alternative embodiment of a tensioning device.

FIG. 4 shows another possible embodiment of a tensioning device 80, in which the spring element 90 is designed as a pretensioned tension coil spring. The basic structure 81 in the form of a hollow cylinder is fastened to a module of the uppermost layer 11 via a flange 87. The fastening may take place, for example, by welding, screwing, or other suitable types of fastening. A movable support 94 is connected to one end of the tension spring 90. The other end of the tension spring is connected to a plate at the upper end of the basic structure 81. The support disk 94 forms a movable support for the tension rod 82. The upper end 83 of the tension rod 62 extends through an opening in the movable support and is supported on the support 94 by means of a screw nut situated on an external thread (not illustrated) of the tension rod. Analogously to the above-mentioned first example of a tensioning device, in the completely installed state the force of the tensioned tension spring 90 corresponds to the oppositely directed tensile force of the tension rod 62, which acts as a tension spring. The ratios of the spring constants for the use of a compression spring discussed above apply here as well. Accordingly, for a positive or negative change in length of the tension rod due to a change in temperature, the change in length is essentially compensated for by a corresponding negative or positive change in length of the softer tension spring, so that the change in the effective tensile stress is significantly reduced.

During assembly of a modular facility, the tension rods must be tensioned to the desired tensile force, using suitable means. The tensioning device 80 subsequently maintains this tension. In FIG. 3, the compression spring 90 is already in the compressed state, with the tension rod tensioned. For this purpose, however, both the tension rod 62 and the compression spring 90 must have been tensioned beforehand. This may take place separately, for example by compressing the compression spring 90 to a certain pressure force value using a suitable external device, and subsequently screwing the nut 84 tightly onto the second support disk 94 while the tension rod 62 is still in the unstressed state. After the external application of force on the compression spring is discontinued, the compression spring expands, and at the same time, the tension rod is tensioned until equilibrium is reached, at which point the forces of the compression spring and of the tension rod are identical. Alternatively, the tension rod and the compression spring may be tensioned simultaneously. For this purpose, for example a hydraulic device, which acts downwardly on the compression spring, may be mounted on the tension rod 62, above the nut 84. In the process, the hydraulic device simultaneously tensions the compression spring and the tension rod until the desired tensile stress is achieved. The nut 84 is subsequently screwed tightly onto the second support disk, so that the tensile stress is maintained when the hydraulic device is removed.

To compensate for a change in length of the tension rod, instead of a spring element it is possible to provide hydraulic means, or also pneumatic springs, which are less advantageous with varying temperatures. Combinations of hydraulic pistons and spring systems are also possible. The tensioning device may additionally have damping elements to avoid buildup of vibrations in the static system.

In one advantageous alternative embodiment variant, the spring element is situated between the tension rod anchor and the module of the lowermost layer, which is functionally identical to the tensioning device discussed above. However, the tension rod is still tensioned from the upper side. Such a variant has the advantage that the spring elements may be accommodated in a space-saving manner in the modules 40a of the lowermost layer.

For use as a static element of the facility structure, besides the features already mentioned above, and compatible outer dimensions, the facility modules 20, 40 of a modular facility 1 according to the invention need only be able to carry out the static functions. Otherwise, the modules 20, 40 may be adapted as desired to the intended purposes. The static functions constitute on the one hand absorption of the load along the tension elements, and on the other hand, sufficient rigidity and mechanical stability.

Figure 5:
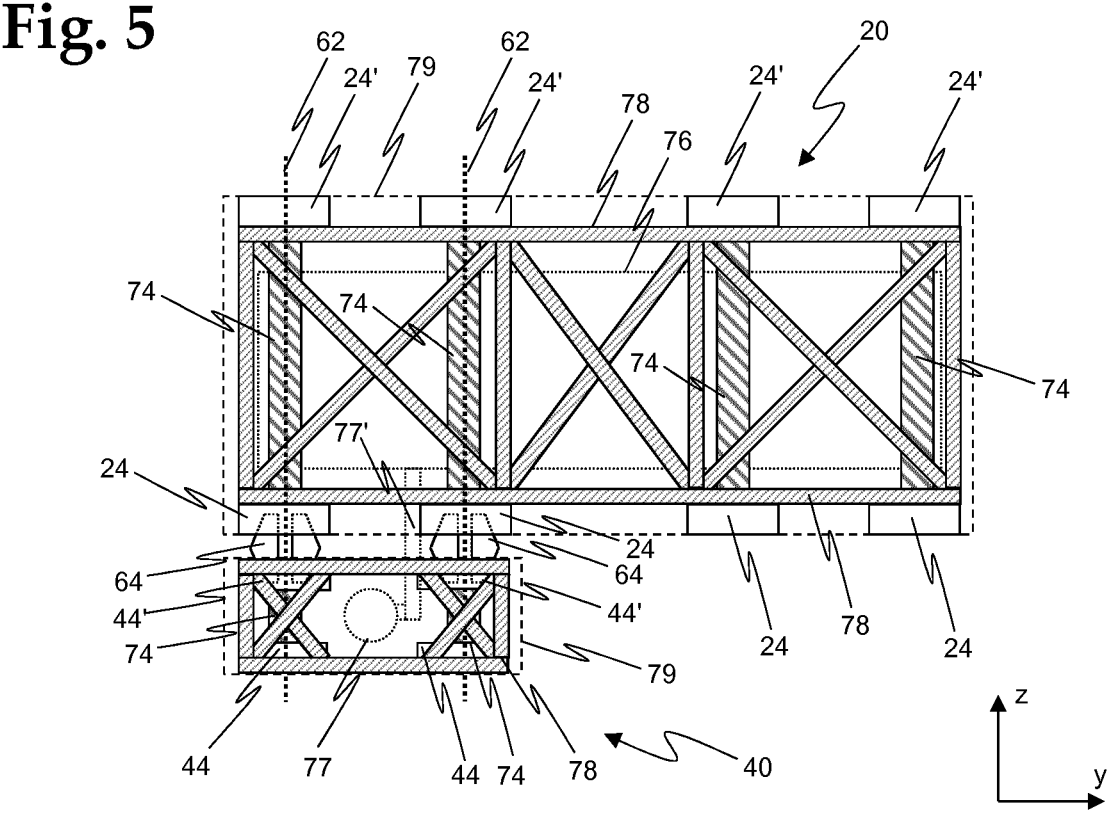
FIG. 5 schematically shows one possible design of the support structure of a functional module and of an intermediate module of a modular facility according to the invention as shown in FIG. 1, in a side view from the left.

FIG. 5 shows the static components of a functional module 20 and an intermediate module 40, as illustrated in FIG. 1(*b*). The other modules 20, 40 have been omitted for the sake of better clarity. The functional module 20 and the intermediate module 40 each Include a support structure 78 in the form of a lattice frame. Eight support columns 74, situated between the support elements 24, 24', are stably connected to the support structure. Each support column has a cavity (not illustrated) over its entire length, through which the tension rod 62 is guided.

In the completely installed state of the modular facility, the support columns of the modules, as well as the support elements and connecting elements situated between the modules situated thereabove, receive the weight of the facility and direct it into the foundation. In turn, the support structure 78 of a module bears the various devices and facility elements, etc., that are part of a given module, and at the same time reinforces the module. Lastly, the modular facility as a whole is reinforced due to the modules of the various layers situated lengthwise and crosswise in alternation.

Modules of a modular facility according to the invention may also receive the weight of the modules situated above same and the tensile force of the tension rods via the support structure itself instead of via support columns, which requires support structures that are correspondingly more stably dimensioned.

The outer shell 79 of the functional module 20 or of the intermediate module 40 does not have a direct static function, and is primarily used as weather protection. The outer shell may also be omitted without impairing the stability. For the case that the outer dimensions of the modules are selected to be compatible with standard cargo containers (ISO containers) to allow efficient transport by truck, rail, and cargo ship, the appropriate mounting devices, etc., for example the customary corner castings, may be mounted on this outer shell. In such a case, the outer shell may correspond to the structure of a conventional cargo container, for example a 20-foot, 40-foot, or 45-foot container, in such a case the outer shell fulfilling a static function only during transport. However, the dimensioning of the facility modules is in no way limited to such container sizes. The modules may also have smaller or larger dimensions.

The facility elements, etc., of the module, which may be different depending on the module, are situated within a module. In the example illustrated, a schematically shown fairly large facility element 76 is situated in the functional module 20 within the support structure 78. This may be a machine, a tank, a power generator, a heat exchanger, or a chemical reactor, for example. Accessible control devices, lounge areas, etc., may also be provided. However, these are only illustrative examples. If an additional functional module should be needed for static reasons, without it being situated in this facility element, such a functional element may also be composed of only a bare support structure. In such a case, however, it is more advantageous to design the module in question as a transport module in which material, for example connecting elements or tension rod segments, may be transported during transport of the modular facility.

Lines 77, cable ducts, etc., may be situated in the intermediate module 40, which has a lower height than the functional module 20, in order to operatively connect various modules to one another. FIG. 5 shows by way of example a line 70 which is situated in the longitudinal direction of the intermediate module 40, and which is connected via a further line 77' to the facility element 76 of the functional module 20 situated above same. A connection of the line parts within the modules 20, 40 may be established only after the entire modular facility, or at least the modules in question, are installed. However, since a majority of the lines, cables, etc. are situated within the modules, these connection operations are limited to the installation of short connecting pieces, or the joining of cables.

In the exemplary embodiment previously described, two basic types of modules, which differ in their relative outer dimensions, were combined. The advantage of the intermediate modules 40, which have only one-third the height of the functional modules 20, is that three such modules, having essentially the same outer dimensions as the functional modules, may be stacked and temporarily combined into a unit for transport.

However, within the scope of the invention it is also possible to construct a modular facility using modules having uniform dimensions, i.e., a facility having only functional modules. It is likewise possible to use more than two module sizes, provided that stacking and bracing according to the invention are possible.

For certain industrial facilities, facility parts are necessary that are very high in comparison to the base surface, for example distillation columns, flue gas cleaning units, silos, etc. Such facility parts cannot be installed in the modules disclosed heretofore. However, it is possible to install such facility parts in modules that can be transported horizontally, and ultimately installed upright in the modular facility.

Figure 6:
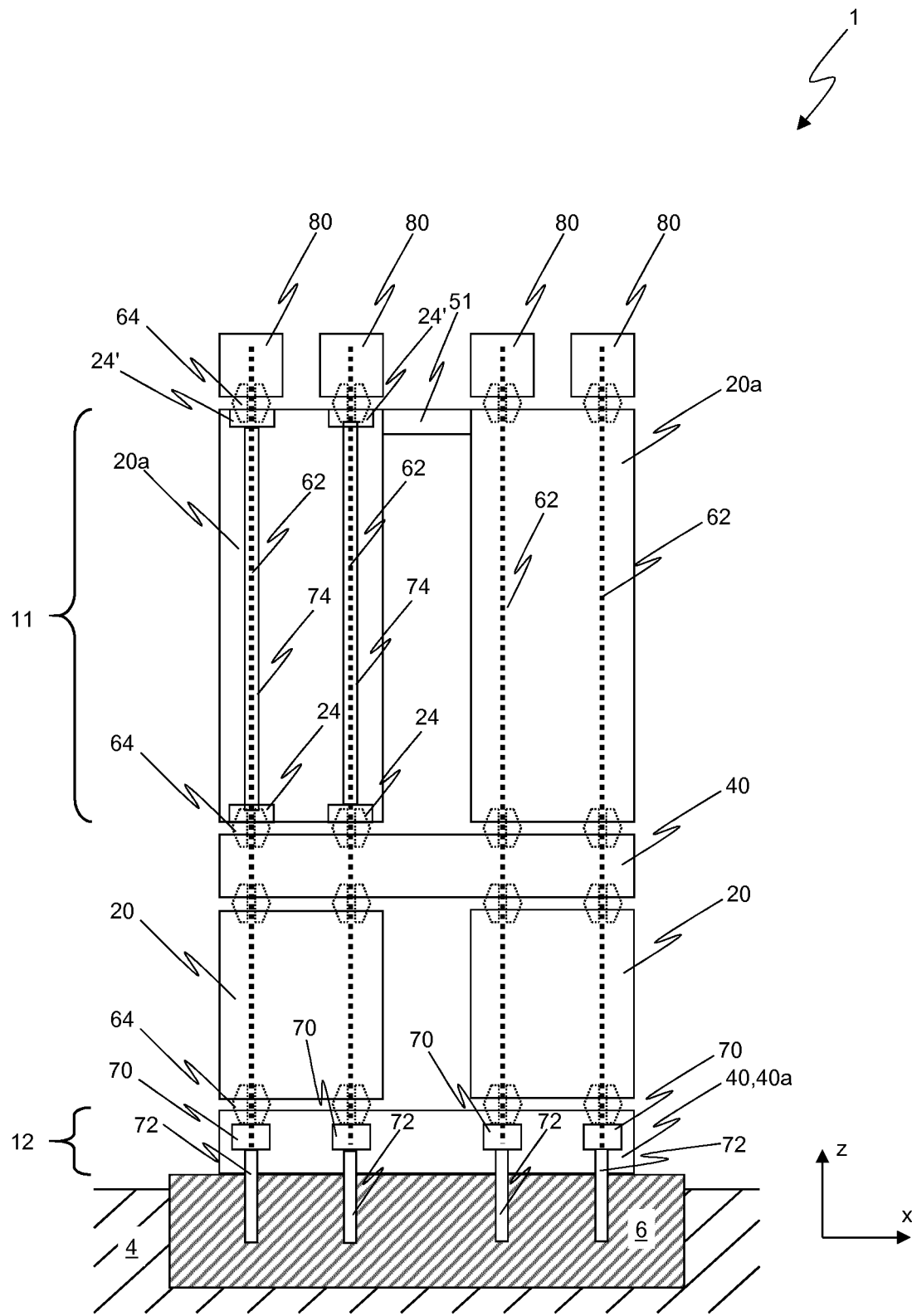
FIG. 6 schematically shows another possible embodiment of a modular facility according to the invention, with vertically oriented modules, (a) in a front view, and (b) in a side view from the left.
Figure 6:
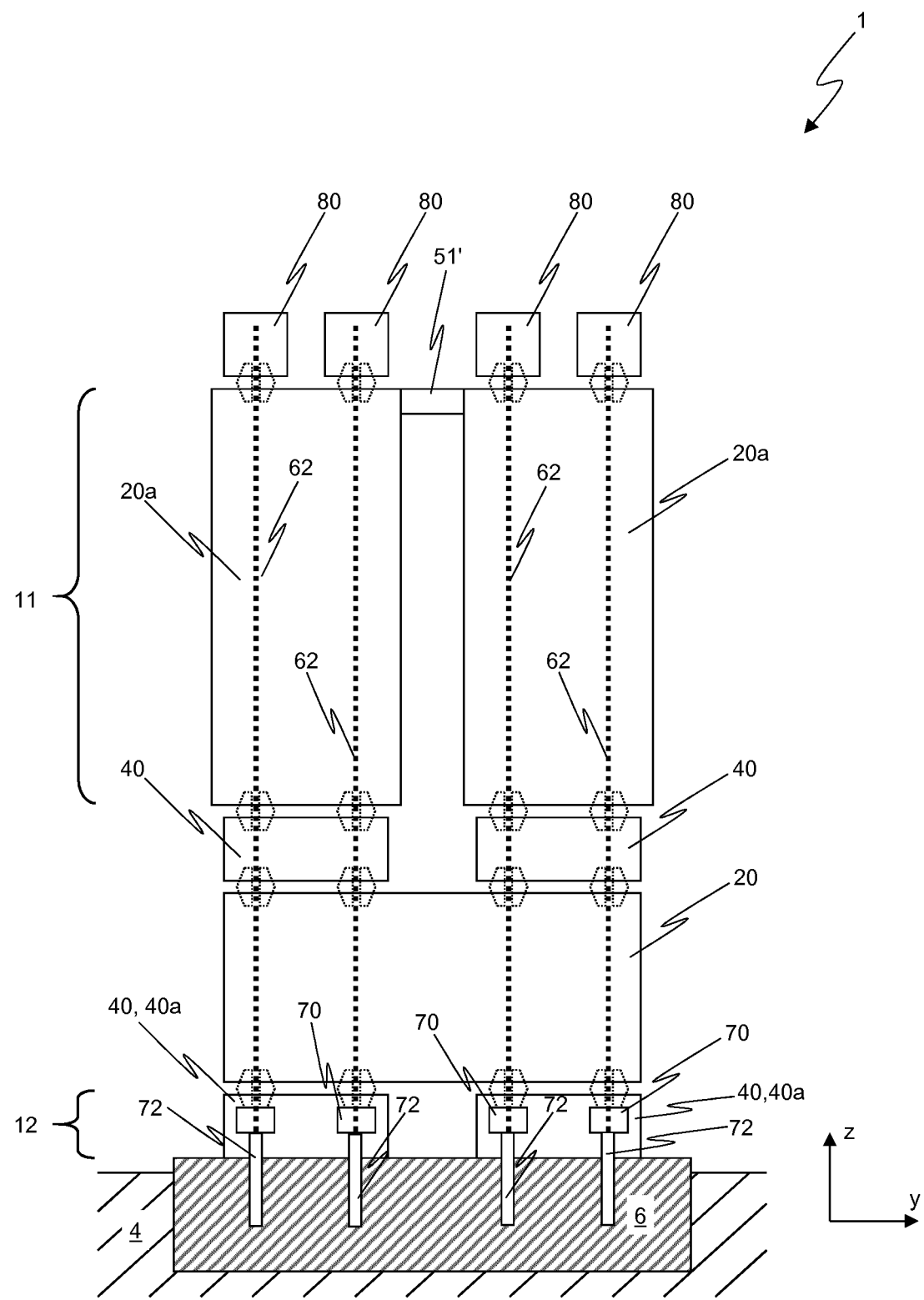

Such an exemplary embodiment of a modular facility according to the invention is illustrated in FIG. 6. The first three layers of modules 40a, 20, 40 are identical to FIG. 1. On the second layer of the intermediate modules 40, however, four high modules 20a are situated, which in turn have four support elements 24, 24' each on a lower side and on an upper side (schematically illustrated only in the left module 20a in FIG. 6(a)) for accommodating the connecting elements 64. Support columns 74 are situated between the support elements 24, 24'.

Two layers of interlocked modules may be situated on the top side t stabilize the high modules. However, if these modules used for stabilization cause interference, for example for a high module that is open at the top, cross braces 51, 51' may instead be mounted between adjacent high modules 20a, as in the exemplary embodiment shown.

For transport, the modules 20a may be laid on a defined lower side so that the support elements 24, 24' rest on the end faces of the module. It is thus possible in particular to provide a high module with the outer shell of a standard cargo container, in the installed state the longitudinal ends of the container forming the top side and bottom side of the high module.

In addition, an alternative fastening of the facility 1 on the foundation 6 is shown in the exemplary embodiment in FIG. 6. Instead of fastening the foundation anchors to the support structure of the lower modules 40a, as illustrated in FIG. 1, the foundation anchors are situated in the extension of the tension elements 62 and tension anchors 70, so that mechanical forces during an earthquake, for example, are transmitted directly from the subsurface 4 via the foundation 6 to the tension elements 62.

Figure 7:
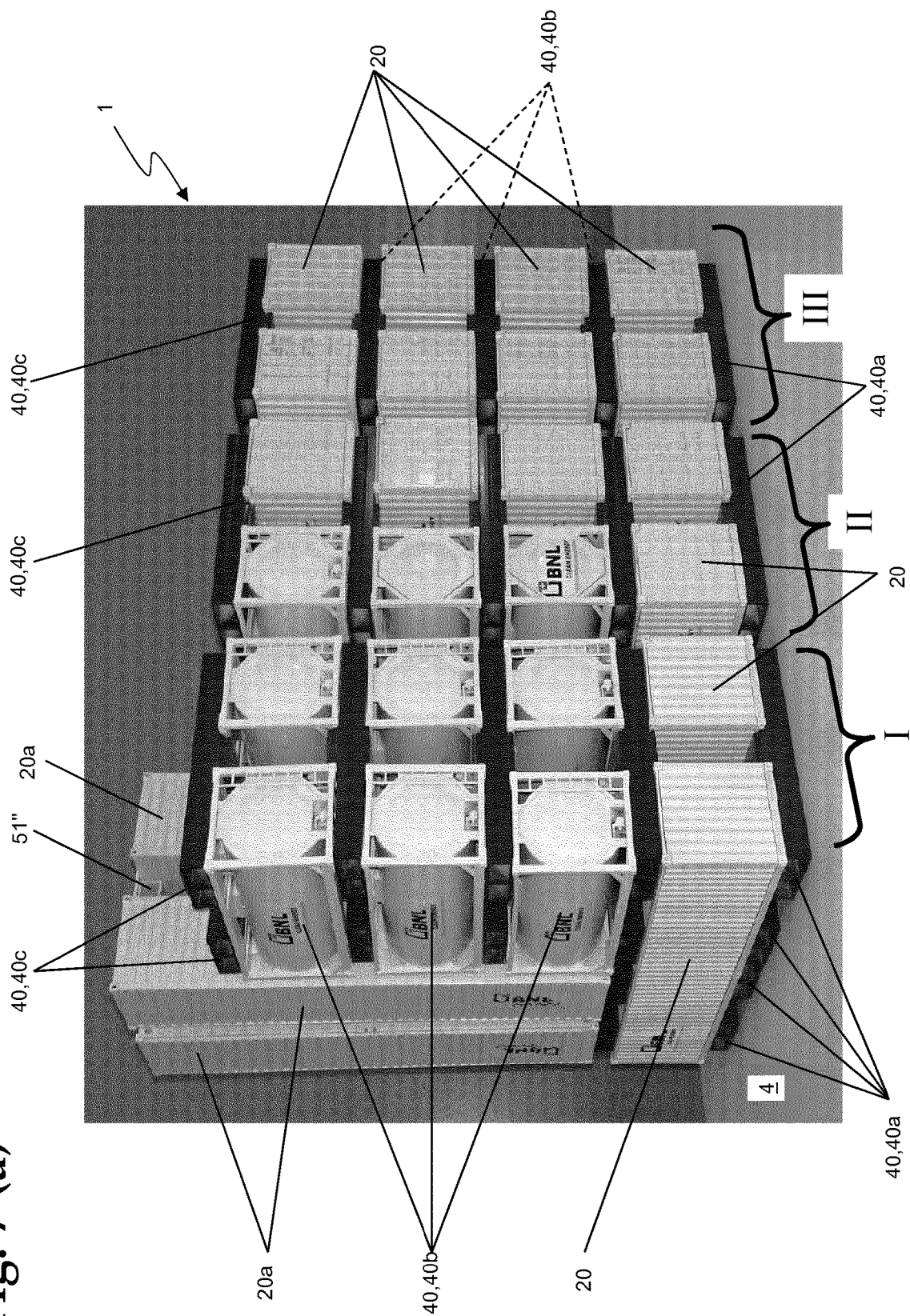
FIG. 7 shows two different views (a), (b) of a three-dimensional model of another embodiment of a modular facility according to the invention.
Figure 7:
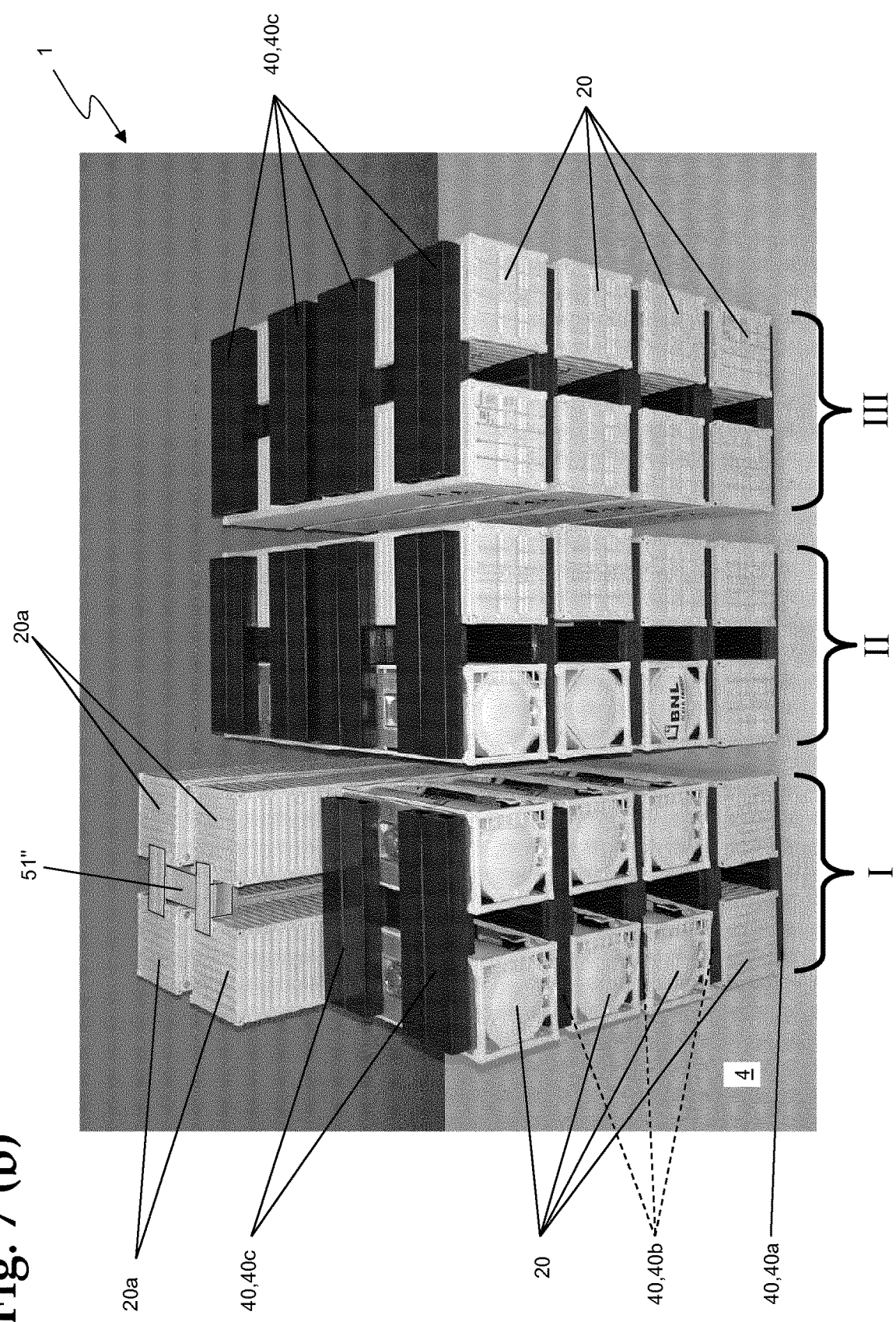

In another possible embodiment of a modular facility according to the invention, the intermediate modules 40 are designed in such a way that in each case four intermediate modules fit in a conventional standard transport container. The functional containers in turn have the size of conventional 20-foot or 40-foot containers. A model of such a modular facility 1 according to the invention is depicted in FIGS. 7(a) and (b) in two different views. The illustrated facility is made up of three separate blocks I, II, III. As an example, block I in a lowermost layer is made up of four intermediate modules 40a that are fixedly connected to the foundation block (not illustrated). Two functional modules 20 are situated on this lowermost layer, at right angles thereto, in the outer shell of a 40-foot cargo container. These functional modules correspondingly have sixteen support elements on the top side and on the bottom side, and sixteen support columns situated in between. A further layer having four intermediate modules 40, 40b is followed, on a front side of block I, by three layers of functional modules 20 having the outer shape of a 20-foot tank container, and intermediate modules 40 in alternation. In the example shown, the tensioning devices are integrated into the intermediate modules 40, 40c of the uppermost layer. Four high modules 20a are situated on a rear side of block I. The tensioning devices are integrated into the top side of the high modules 20. For stabilizing the high modules 20a, the four modules are connected by a central cross brace element 51" that rigidly connects all four high modules 20a.

Since the length and width of the intermediate elements 40 are less than those of the functional modules 20, in the exemplary embodiment shown this results in a denser, more space-saving design than illustrated in FIG. 1, for example.

Figure 8:
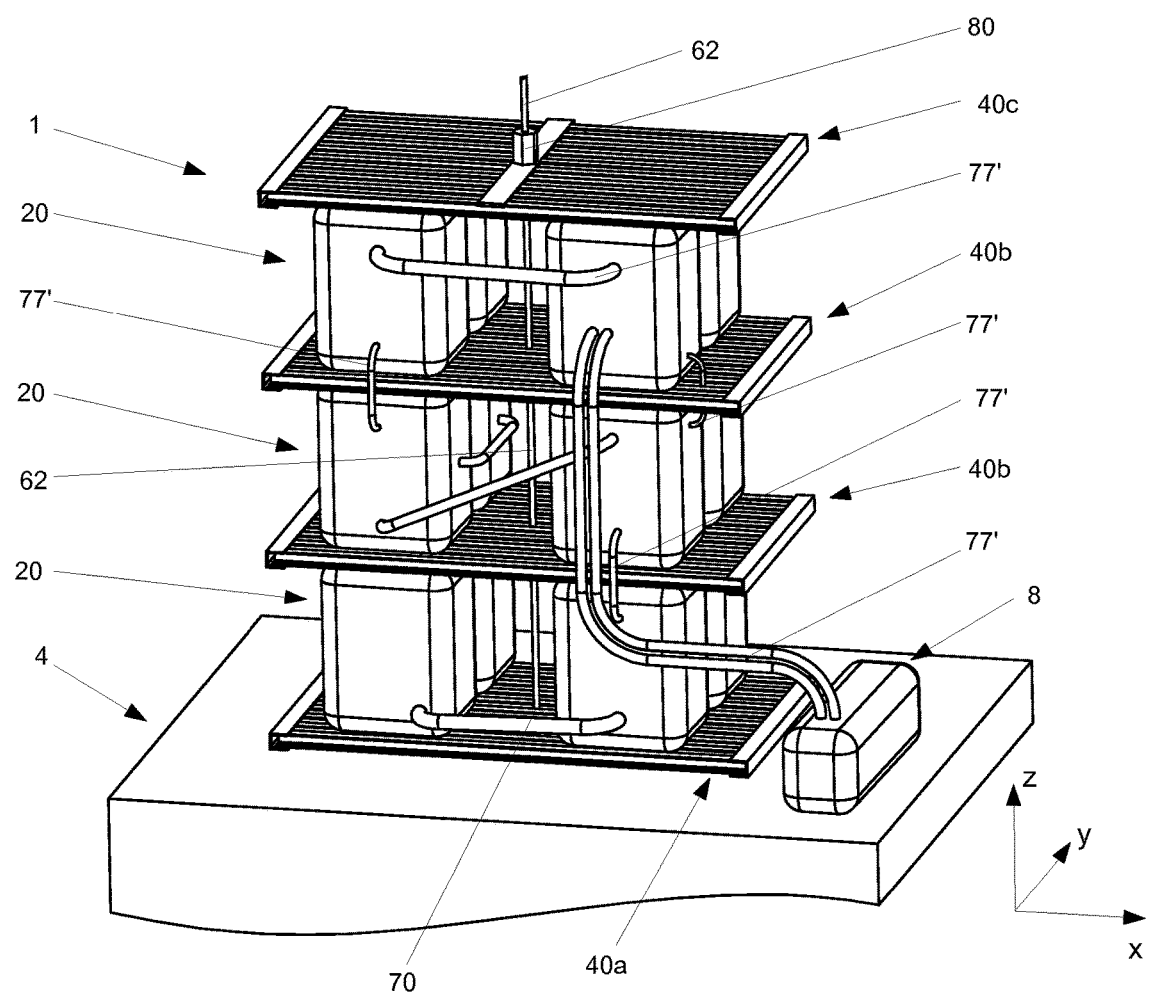
FIG. 8 shows a schematic illustration of another embodiment of a modular facility according to the invention, in a perspective view.

Another possible embodiment of a modular facility 1 according to the invention is illustrated in FIG. 8. The facility 1 has twelve functional modules 20 (schematically illustrated as rounded cubes) that are distributed on three facility levels situated vertically one above the other (i.e., in the z direction), essentially parallel (x/y plane) to the surface of the subsurface 4. In the illustrated exemplary embodiment, four functional modules 20 of a lower facility level are situated on a base support module 40a, which in turn is suitably situated on the subsurface 4, for example on one or more foundation blocks (not illustrated). The four functional modules 20 of the lower facility level have essentially the same height. Situated on the functional modules is an intermediate support module 40b, on the top side of which four functional modules 20 are in turn situated in a middle facility level. Situated on the functional modules 20 of the middle facility level is a further Intermediate support module 40b, on which four functional modules 20 on an upper facility level are situated. Lastly, a top support module 40c is provided which rests on the top side of the four functional modules 20 of the upper facility level.

A central tension element 62 extends vertically in the z direction from an anchor (not illustrated) fastened in the subsurface 4, through corresponding openings in the modules 40a, 40b, 40c, through all facility levels to the top support module 40c. The tension element 62 is situated essentially at the midpoint of the particular facility levels; i.e., in each case it is approximately the same distance from the four functional modules 2 of a facility level, resulting in a symmetrical force distribution.

The same as for the preceding embodiment variants, a single tension rod or multiple parallel tension rods made of steel or carbon fibers, or one or more parallel wire cables may be used as a tension element 62. Likewise, a tension element may be made up of multiple individual elements, which are the same or different, suspended in series.

Alternatively or additionally, fastening of the tension element 62 to the base support module 40a is possible. In such embodiments of the invention, the anchoring of the overall facility may take place by suitable anchoring of the base support module 40a in the subsurface 4.

In the area of its upper end, the tension element 62 is in mechanical operative connection with a tensioning device 80 that acts on the tension element 62 with a tensile force. Due to this tensile force, the various intermediate modules 40, 40a, 40b and the functional modules 20 are braced against one another in the vertical direction in such a way that the modules 20, 40a, 40b, 40c are stably held together, even without screw connections or the like.

In the exemplary embodiment shown, the tensioning device 80 is mounted on the top support module 40c, but may also be situated inside or below the top support module 40c.

The top support module 40c, intermediate support modules 40b, and also the base support module 40a may be produced from steel profile structures, for example. However, other types of construction for producing lightweight, plate-shaped (flat) support structures having sufficient mechanical strength and rigidity are also possible, for example honeycomb structures or corrugated metal sheets. Since the force distribution takes place from the central tension rod to the functional module stack via the base support module 40a and the top support module 40c, these must have a more stable design than the intermediate support modules 40b, which essentially mainly ensure the rigidity of the overall structure of the facility 1.

The various functional modules 20 of the exemplary embodiment of a modular facility 1 shown are in a suitable operative connection with one another, for example via lines for transporting fluid materials, power lines, control cables, etc. The examples of such connecting lines 7T shown in FIG. 8 are understood to be purely illustrative. A modular facility 1 according to the invention may also include external facility modules 8.

Figure 9:
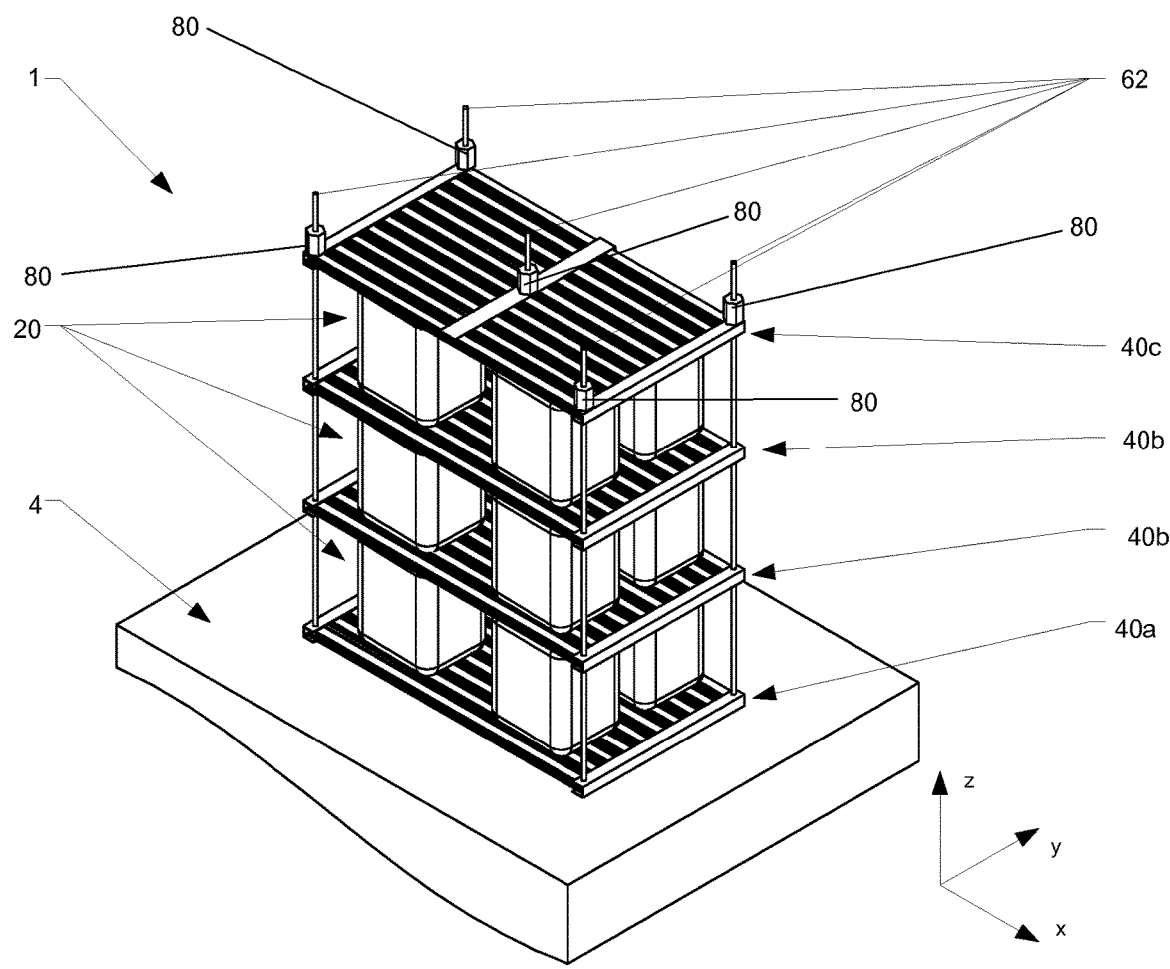
FIG. 9 shows a schematic illustration of yet another embodiment of a modular facility according to the invention, in a perspective view.

FIG. 9 shows another modular facility 1 according to the invention, having functional modules 20 situated in three planes, similar to the example from FIG. 8, the connecting lines being omitted for the sake of clarity. In the example shown, the modules 20, 40a, 40b, 40c are braced with five tension elements 62. The use of multiple distributed tension elements 62, in comparison to a single tension element 62, in particular allows the use of a top support module 40c having a lower plate rigidity, as the result of which more lightweight and economical designs may be used for the top support module. In addition, the use of multiple tension elements 62 allows better adaptation of the facility to the mechanical properties of the functional modules 20.

Figure 10:
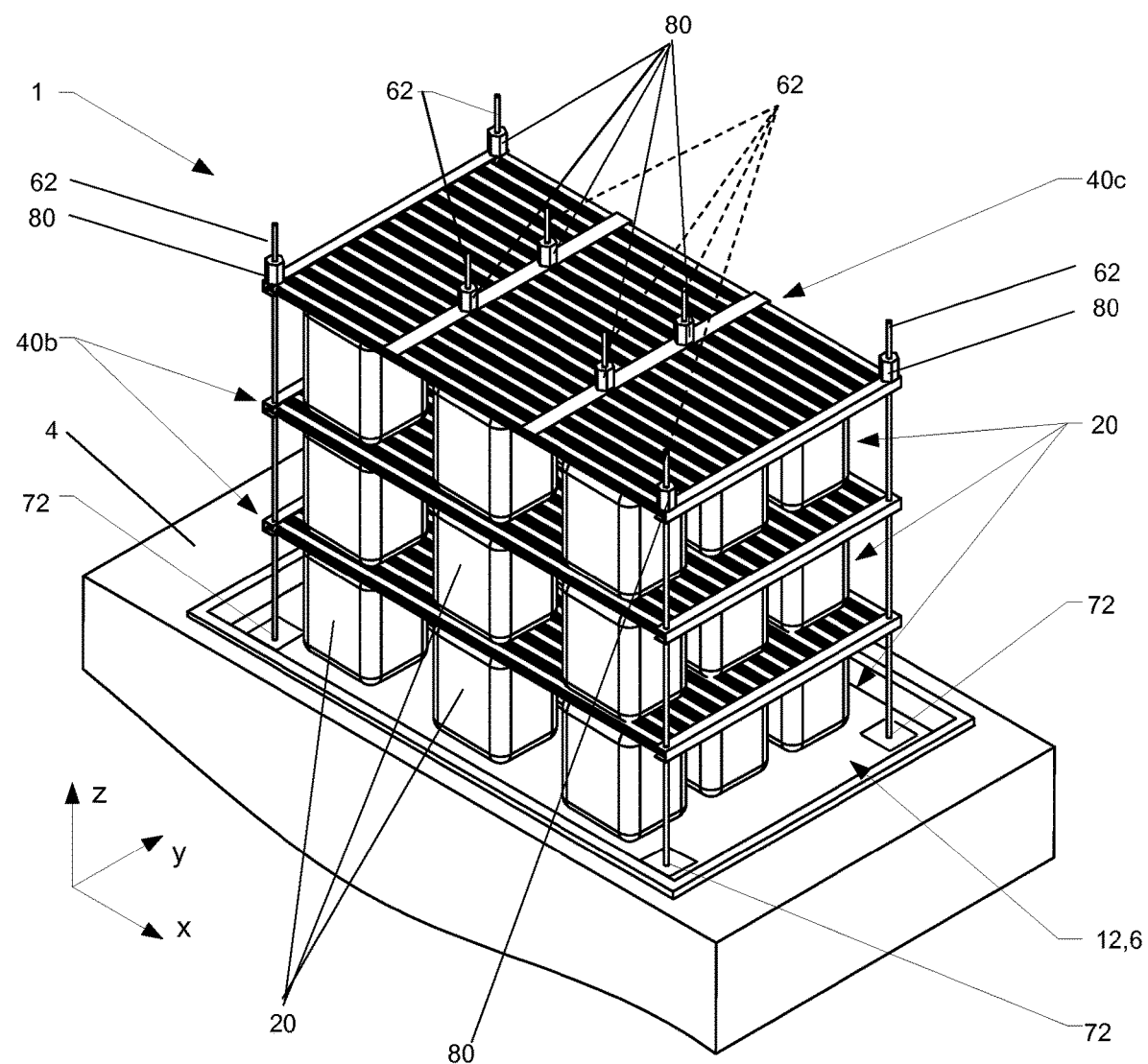
FIG. 10 shows a schematic illustration of another embodiment of a modular facility according to the invention, in a perspective view.

FIG. 10 shows another variant of a modular facility 1 according to the invention, having 27 functional modules 20 that are situated in three planes and braced with eight tension elements 62. The base support module 40a is made up essentially of a basin 12, advantageously made of reinforced concrete, which is partially embedded in the subsurface 4. The anchoring of the tension elements 62 takes place via anchoring devices 72 in the basin. The basin 12 is used in particular as a safety precaution, in that it prevents uncontrolled escape of liquids to the environment in the event of malfunctions within the facility. Such catch basins are therefore often stipulated as a safety measure for chemical production facilities.

Figure 11:
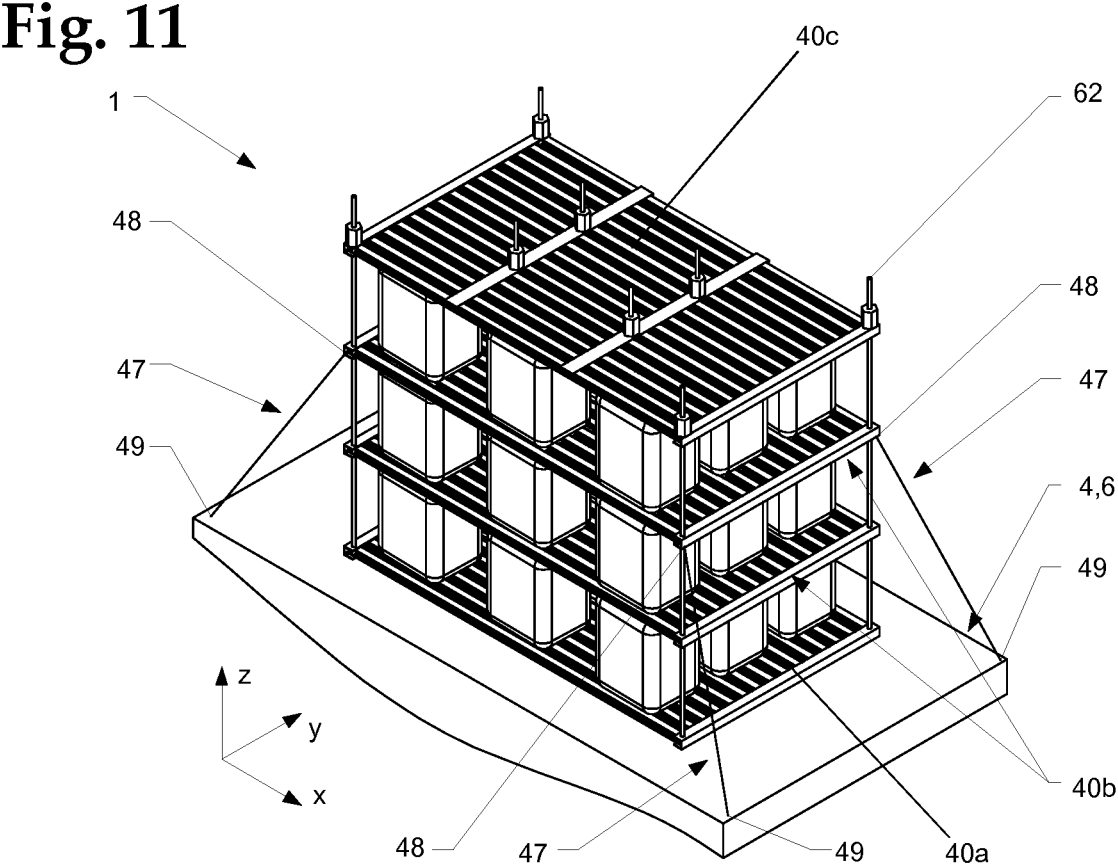
FIG. 11 shows a schematic illustration of yet another embodiment of a modular facility, in a perspective view.

FIG. 11 shows another advantageous embodiment of a modular facility 1 according to the invention, which has a basic design corresponding to that from FIG. 10. For additional stabilization against laterally acting forces, the facility 1 has guy wires 47 that mechanically connect tie-down points 48, situated on the intermediate support modules 40b, to external anchorings 49. In particular, shear forces on the facility in the x/y direction may be reduced in this way. Additionally or alternatively, guy wires are possible between tie-down points, situated on the top support module, and external anchorings.

Figure 12:
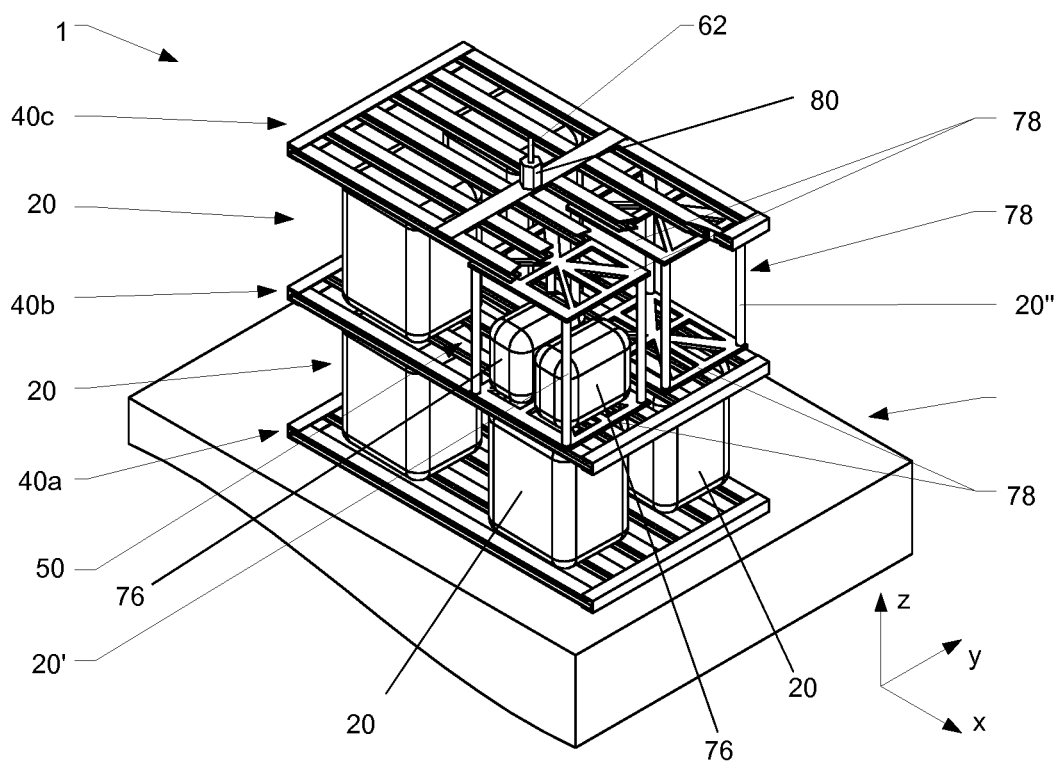
FIG. 12 likewise shows a schematic illustration of one alternative embodiment of a modular facility, in a perspective view.

FIG. 12 shows another exemplary embodiment of a modular facility 1 according to the invention, having functional modules 20, 20', 20" situated in two facility levels. To also allow installation of facility elements 76 whose height differs greatly from the functional modules 20 on the same facility level, these facility elements are situated in a functional module 20' made up essentially of a support structure 78. For better visibility of the support structure, a portion of the top support module 40c situated thereabove is omitted.

Likewise, a functional module 20" made up only of the support structure 78 may be used as a placeholder in order to occupy locations at which no operative functional modules 20 are present. This may be meaningful, for example, when certain locations within the facility are intended to be kept open for possible subsequent expansions of the facility.

Figure 13:
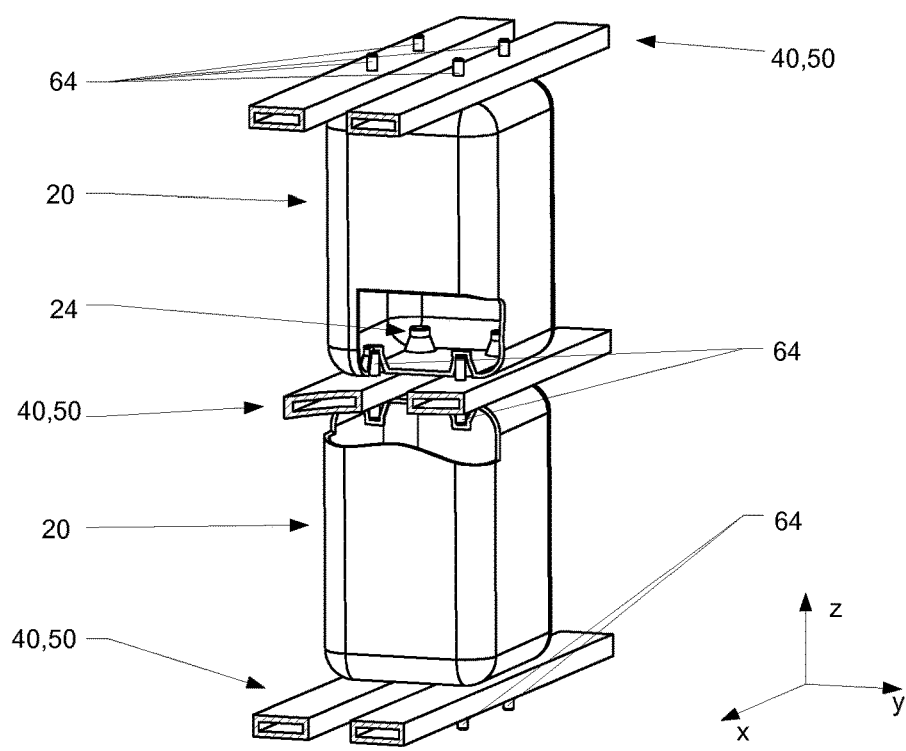
FIG. 13 schematically shows two possible variants of a horizontal form-fit support of functional modules in a perspective view, (a) with connecting bolts in a conical support element, and (b) with surrounding lateral mountings. Portions of the modules are cut away in the figure in order to make the design of the support visible.
Figure 13:
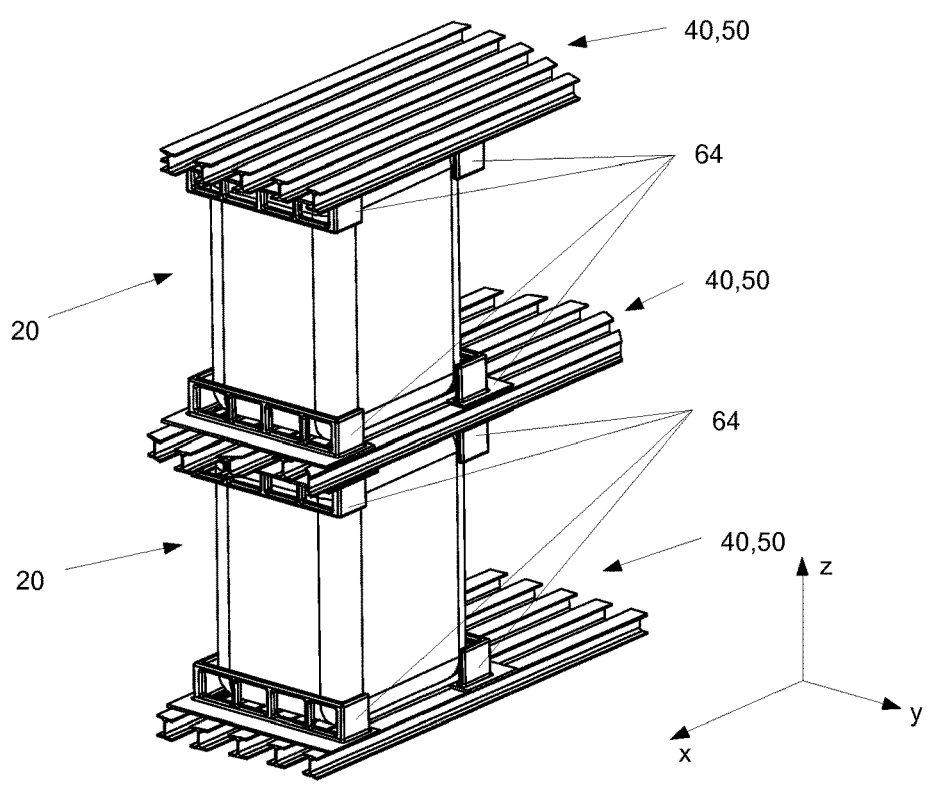

FIG. 13 shows two other possible horizontal form-fit supports of functional modules 20 on beams 50 of an intermediate support module 40b (or base support module 40a or top support 40c), which may be used in particular in the embodiments from FIGS. 8 through 12. The horizontal form-fit support prevents the individual functional modules 20 from shifting in the horizontal direction relative to the beams 50 or the intermediate module 40a/40b/40c.

In the embodiment illustrated in FIG. 13(a), the horizontal form-fit support is made up essentially of bolts 64 that are oriented in the vertical direction (z direction) and held in a form-fit manner in conical bolt seatings 24, 24' in the functional modules 20. It is also possible for a bolt to be designed to pass through a beam, and at the same time to be used for the horizontal form-fit support of two functional modules arranged one above the other. FIG. 13(b) shows another variant of a horizontal form-fit support. The functional modules 20 are supported against shifting in the horizontal direction by frame elements 64. The frame elements 84 are in fixed mechanical connection with the beams 50.

Figure 14:
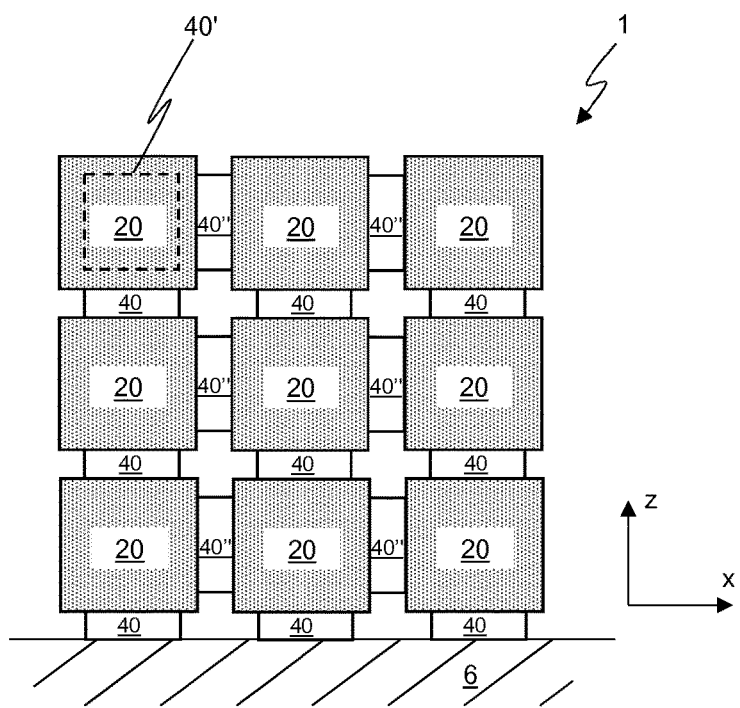
FIG. 14 schematically shows another embodiment of a modular facility according to the invention, (a) in a front view, and (b) in a side view.
Figure 14:
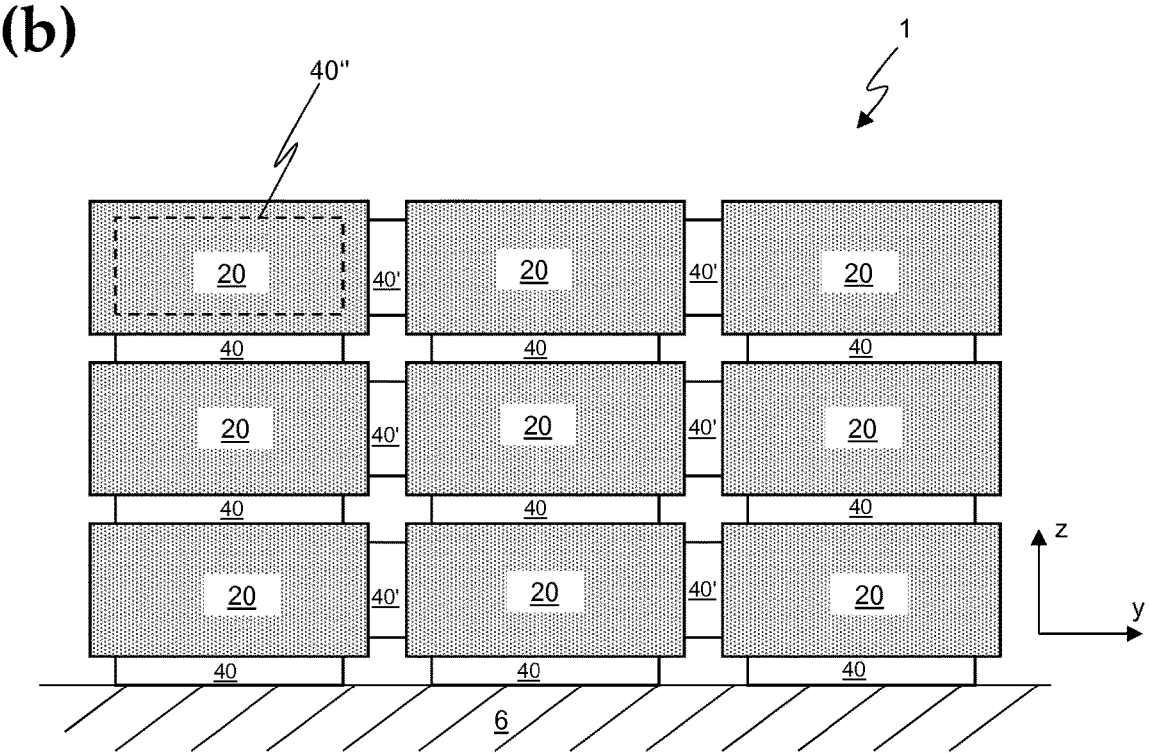

Another embodiment of a modular facility 1 according to the invention is schematically illustrated in FIG. 14, and includes a plurality of cuboid-shaped modules 20 and connecting modules 40, 40', 40". In the front view in FIG. 14(a), the position of the connecting module 40' (not visible), situated behind the module 20 at the top left, is indicated by dashed lines for purposes of illustration. The same similarly applies for the other functional modules 20. In the side view in FIG. 14(b), once again the position of the connecting module 40", not visible, is indicated by dashed lines.

Nine flat, cuboid-shaped connecting modules 40 are situated along a lattice on a foundation base 6, and are connected to the foundation base 6 via suitable means, as already described for other embodiments. A functional module 20 is situated on each of these connecting modules of the lowermost layer, and is connected in a form-fit and/or force-fit manner to the connecting module 40 situated below same. Adjacent modules 20 are connected in a form-fit and/or force-fit manner at the side faces via flat, essentially cuboid-shaped connecting modules 40", and are analogously connected at the front faces via flat, cube-shaped connecting modules 40'. The form-fit and/or force-fit connection between functional modules and connecting modules 40, 40', 40" may take place by screw connections, for example, or other suitable reversible fastening methods such as snap locks, bayonet locks, etc. Fastening by welding is also possible, although in such a case the facility can be reconstructed only in an inefficient manner. The form-fit and/or force-fit connection may also take place by suitable bracing of the modules with tension elements, preferably in the vertical direction, but also in the horizontal direction, as already discussed in detail above. In such a case, support columns of the inner support structure of the functional modules preferably extend between fastening points situated vertically above one another.

The connecting modules 40, 40'. 40" are in each case connected to corresponding fastening points at the side walls of the functional modules, at least 4 to 8 connecting points advantageously being provided for each side face. The connecting points of the modules 20, 40, 40', 40" are part of the support structure 78 of the modules, as already explained with reference to FIG. 5, for example.

To construct the overall facility, the individual functional modules 20 and connecting modules 40, 40', 40" are positioned and fastened to one another in succession, thus constructing the facility from bottom to top. Functional modules may also already be connected to individual connecting modules prior to assembly, and in this form placed on the facility as a combined building block, in order to reduce the number of assembly steps during the actual construction.

The connecting modules may contain portions of the infrastructure, for example pipeline sections, cable ducts, electrical lines, and smaller pieces of equipment. However, it is also possible for these modules to have a particularly flat design in the connecting direction when they are intended to have essentially only a connecting function. In such a case, connecting modules for connecting functional modules may have the size of ISO containers, for example a height of only 10 cm.

A modular design allows significantly increased torsional stability. The modules are reinforced in their entirety. In particular, a force acting horizontally, for example due to wind effects or rotating machines, may cause only a minor lateral deflection of the overall structure. Without being bound to a specific theory, it is the opinion of the applicants that this effect is achieved due to a force, acting in the horizontal direction on a functional module, being deflected upwardly and downwardly on both sides by the connecting modules, which themselves are very rigid and which are arranged in three different orientations between the functional modules, at right angles to the action of force. In contrast, isolated connecting points have only slight torsional rigidity, so that forces are able to propagate through the overall structure much more strongly along their original direction. A lateral application of force to an individual module thus results in a significantly greater lateral displacement of the modules of the layer in question compared to the overall structure. The same naturally applies for forces that act vertically.

Such a reinforced design of a modular facility, compared to the prior art in which the individual modules are connected to one another at isolated connecting points at the abutting corners or edges, has the particular advantage that, due to the minor displacement movements between the modules for lines that extend between two modules, no special measures need to be taken. Thus, for example, high-pressure steam lines may be situated between two adjacent modules without the need for a complicated expander for compensating for dynamic changes in the geometry of the line.

Figure 15:
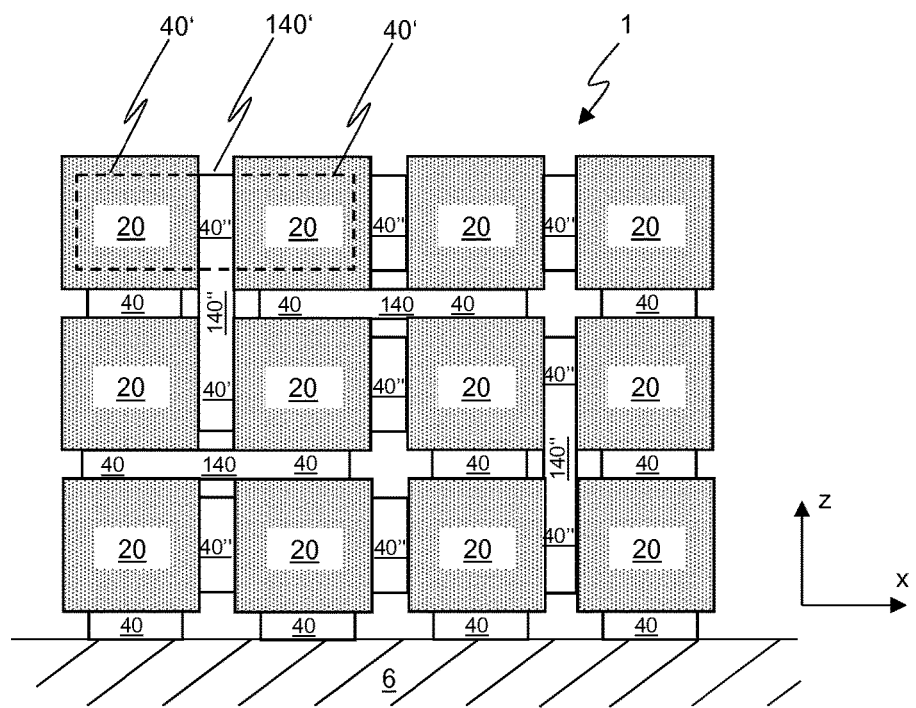
FIG. 15 schematically shows another embodiment of a modular facility according to the invention in a front view.

FIG. 15 schematically shows another embodiment of such a modular facility, in which, between the first and second layer and between the second and third layer of functional modules 20, in each case two directly adjacent connecting modules 40 that are parallel in the (x-y) plane are designed as a common connecting module 140. Analogously, two pairs of directly adjacent connecting modules 40" that are parallel in the (y-z) plane are designed as a common connecting module 140". In addition, a common connecting module 140' in the (x-z) plane (not visible) is illustrated by dashed lines.

The use of such common connecting elements has the advantage that the overall structure of the facility is generally additionally reinforced. Furthermore, the rigidity of the overall structure may be adapted as needed by the targeted placement of such common connecting modules 140, 40', 140" in the three planes (x-y), (x-z), (y-z).

Figure 16:
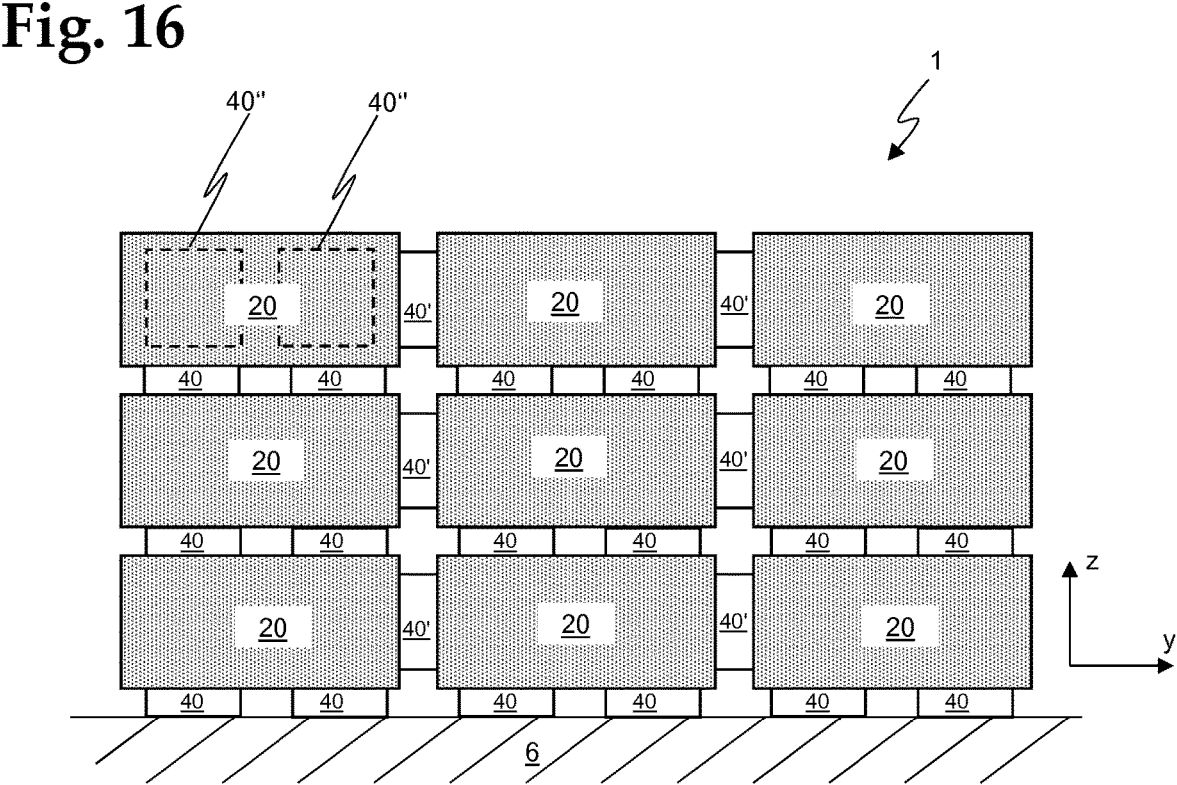
FIG. 16 schematically shows yet another embodiment of a modular facility according to the invention in a side view.

FIG. 16 schematically shows yet another embodiment of such a modular facility, in which two connecting modules 40, 40" are used in each case for connecting the long side faces of the functional modules 20, while a single connecting module is provided for connecting the front sides. This embodiment variant has the advantage that all connecting modules may have identical designs with regard to shape and inner construction.

The scope of the present invention is not limited to the specific embodiments described herein. Rather, various other modifications of the present invention, which likewise fall within the scope of protection of the claims, result for those skilled in the art from the description and the associated figures, in addition to the examples disclosed herein.

Furthermore, various references are cited in the description, whose disclosure in their entirety is hereby by reference List of reference numerals 1 modular facility
4 subsurface
6 foundation base
8 external facility module
9 connecting lines
11 uppermost module layer
12 lowermost module layer
12 catch basin
20, 20a functional module
20, 20', 20" functional module
20a high module
21 bottom side
22 top side
24, 24' support element, seating for connecting element
25, 25' conical lateral surface
26 central opening
40, 40', 40" intermediate module, connecting module
40a base support module
40b intermediate support module
40c top support module
41 bottom side
42 top side
44, 44' support element, seating for connecting element
45, 45' conical lateral surface
46 central opening
47 guy wire
48 tie-down point (fastening)
49 external anchorings
50 beam
51, 51', 5" cross brace
62 tension element, tension rod
64 connecting element, connecting cone
66, 66' conical lateral surface
68 through hole
70 tension rod anchor, counterbearing
72 foundation anchor
74 support columns
76 facility elements
77, 77' lines
78 support structure
79 shell, outer wall
80 tensioning device
81 basic structure
82 support element, seating for connecting element
83 conical lateral surface
84 nut
86 housing
87 flange
90 spring element, compression spring
92 first support disk
93 sleeve
94 second support disk, movable support
95 sleeve
140 common connecting module

The invention claimed is:

1. A modular facility comprising
a plurality of cuboid-shaped modules arranged in two or more vertically stacked layers,
said cuboid-shaped modules comprising a support structure and a plurality of fastening points arranged on said support structure for connecting a module to an adjoining module above or below said module in a form fit manner;
said fastening points arranged on said support structure so as to be in alignment with the fastening points of adjoining modules above or below said fastening points and comprising a support element having a conical recess for receiving a connecting element adapted to fit within said recess such that a form-fit connection is formed between aligned adjoining modules when the connecting element is introduced into the recess,
wherein said connecting element is in the shape of a double cone or double truncated cone and wherein each cone or truncated cone of the connecting element is situated in the conical recess and rests on same in flush alignment,
wherein the connecting element is shaped so that at each fastening point no portion of the module is in contact with a surface of the connecting element that is not part of an outer surface of the conical portions of the connecting element, and no portion of a module rests directly on portion of an adjoining module, and
wherein the modular facility comprises at least one tension device comprising at least one tension element for providing tensile force along a vertical axis between the layers of modules such that a force fit connection between the fastening points of vertically aligned adjoining modules is formed when the tensile force is applied.

2. The modular facility of claim 1, wherein the modules comprise at least three fastening points on a top side of the support structure and three fastening points on a bottom side of the support structure.

3. The modular facility of claim 1 where the tension element comprises one or more tension rods.

4. The modular facility of claim 1, wherein the tension device comprises a spring.

5. The modular facility of claim 1, wherein said cuboid modules have different dimensions.

6. The modular facility of claim 5, comprising functional cuboid modules and intermediate cuboid modules where the height of the intermediate cuboid modules is less than the height of the functional cuboid modules.

7. The modular facility of claim 5, comprising functional cuboid modules and intermediate cuboid modules where the height of the intermediate cuboid modules is one third that of the functional cuboid modules.

8. The modular facility of claim 5, wherein layers of intermediate modules are alternated with layers of functional modules.

9. The modular facility of claim 1 wherein the modules are arranged so that the fastening points of two or more modules of one layer are connected to fastening points of one module situated above or below the two or more modules.

10. The modular facility according to claim 1 wherein the modules are interlocked and stacked in such a way that at least a portion of the modules form a three-dimensional lattice.

11. The modular facility of claim 1, further comprising at least one connecting module situated between oppositely situated side faces of two adjacent cuboid shaped modules and connected thereto in at least one of a force-fit or form fit manner.

12. The modular facility according to claim 11, comprising one or more common connecting modules wherein said common connecting modules connect a plurality of adjacent cuboid shaped modules along a common plane.

13. The modular facility according to claim 12, wherein at least one pair of adjacent cuboid shaped functional modules is connected by more than one connecting module at a side faces of said pair of adjacent cuboid shaped functional modules.

14. The modular facility of claim 1, wherein the tension element is anchored on a lowermost layer of modules and when acted upon provides a tensile force along the vertical axis so that modules are pressed together with a force fit connection at the fastening points.

15. The modular facility of claim 1, wherein the support and connecting elements comprise a central opening through which the at least one tension element passes.

16. The modular facility of claim 1, wherein the at least one tensioning device comprises
a base structure fastened on a module of a lowermost layer of modules or a foundation block or a module of an uppermost layer of modules and a moveable support that is movable with respect to the base structure along the longitudinal axis of the tension element; said base and moveable support having an opening wherein said one or more tension elements pass and said tension element being connected at one end to the moveable support and at the other end to a module of a lowermost layer of modules or a foundation block or a module of an uppermost layer of modules;
a spring element is a compression spring situated between the base structure and the moveable support structure.

17. The module facility of claim 16, wherein a ratio of the spring constant of the one or more tension elements to the spring constant of the compression spring is about 4 to 1.

18. The module facility of claim 16, wherein a ratio of the spring constant of the one or more tension elements to the spring constant of the compression spring is about 6 to 1.

19. The module facility of claim 16, wherein a ratio of the spring constant of the one or more tension elements to the spring constant of the compression spring is about 9 to 1.

20. The modular facility of claim 1, wherein the tension element comprises one or more tension cables.

21. The modular facility of claim 1, wherein the tension element is anchored on a foundation block and when acted upon provides a tensile force along the vertical axis so that the modules are pressed together with a force fit connection at the fastening points.

22. An assembly set for constructing a modular facility comprising
a plurality of cuboid-shaped modules comprising a support structure and a plurality of fastening points arranged on said support structure for connecting a module to an adjoining module above or below said module;
said fastening points comprising a support element having a conical recess for receiving a connecting element in the shape of a double cone or double truncated cone wherein the double cone or double truncated cone is adapted to fit within said recess in flush alignment and a form-fit connection is formed between aligned adjoining modules when the connecting element is in the recess;
a plurality of said connecting elements;
at least one tension device comprising a tension element for providing a tensile force along a vertical axis; and
wherein the connecting elements are shaped so that in an assembled state of a modular facility at each fastening point no portion of the module is in contact with a surface of the connecting element that is not part of an outer surface of the conical portions of the connecting element, and no portion of a module rests directly on a portion of an adjoining module.

23. The assembly set according to claim 22 wherein the support elements and connecting elements have a central opening.

* * * * *